United States Patent
Sugita et al.

(10) Patent No.: US 10,290,899 B2
(45) Date of Patent: May 14, 2019

(54) SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: Murata Manufacturing Co., Ltd., Kyoto (JP)

(72) Inventors: Shuhei Sugita, Kanagawa (JP); Tadahiko Kubota, Kanagawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 38 days.

(21) Appl. No.: 15/512,059

(22) PCT Filed: Aug. 11, 2015

(86) PCT No.: PCT/JP2015/072740
§ 371 (c)(1),
(2) Date: Mar. 16, 2017

(87) PCT Pub. No.: WO2016/059861
PCT Pub. Date: Apr. 21, 2016

(65) Prior Publication Data
US 2017/0294679 A1 Oct. 12, 2017

(30) Foreign Application Priority Data
Oct. 14, 2014 (JP) .................................. 2014-210083

(51) Int. Cl.
*H01M 4/13* (2010.01)
*H01M 10/0565* (2010.01)
(Continued)

(52) U.S. Cl.
CPC ......... *H01M 10/0565* (2013.01); *B60L 11/18* (2013.01); *H01M 4/134* (2013.01);
(Continued)

(58) Field of Classification Search
CPC ......... H01M 10/0565; H01M 10/0525; H01M 10/425; H01M 4/134; H01M 4/38;
(Continued)

(56) References Cited

U.S. PATENT DOCUMENTS

| 2011/0100735 A1* | 5/2011 | Flett | B60K 6/46 180/65.22 |
| 2013/0149604 A1* | 6/2013 | Fujiki | H01M 4/667 429/211 |

FOREIGN PATENT DOCUMENTS

| CN | 103050707 A | 4/2013 |
| JP | 03-012447 A | 1/1991 |

(Continued)

OTHER PUBLICATIONS

Office Action for CN Patent Application No. 201580051941.0, dated Aug. 28, 2018, 06 pages of Office Action and 09 pages of English Translation.

*Primary Examiner* — Jane J Rhee
(74) *Attorney, Agent, or Firm* — Chip Law Group

(57) ABSTRACT

A secondary battery includes a cathode; an anode; and (1) a first polymer compound layer disposed between the cathode and the anode and being adjacent to the cathode, (2) a second polymer compound layer disposed between the cathode and the anode and being adjacent to the anode, or (3) the first polymer compound layer and the second polymer compound layer. One or both of the first polymer compound layer and the second polymer compound layer contain a polymer compound containing fluorine (F) as a constituent element and a conductive material dispersed in the polymer compound.

11 Claims, 8 Drawing Sheets

(51) Int. Cl.
  *H01M 4/134* (2010.01)
  *H01M 4/38* (2006.01)
  *B60L 11/18* (2006.01)
  *H01M 4/525* (2010.01)
  *H01M 10/0525* (2010.01)
  *H01M 4/587* (2010.01)
  *H01M 10/42* (2006.01)
  *H01M 4/133* (2010.01)
  *H01M 4/58* (2010.01)

(52) U.S. Cl.
  CPC ............. *H01M 4/38* (2013.01); *H01M 4/386* (2013.01); *H01M 4/387* (2013.01); *H01M 4/525* (2013.01); *H01M 4/587* (2013.01); *H01M 10/0525* (2013.01); *H01M 10/425* (2013.01); *H01M 4/133* (2013.01); *H01M 4/5825* (2013.01); *H01M 2220/20* (2013.01); *H01M 2220/30* (2013.01); *Y02E 60/122* (2013.01); *Y02T 10/7011* (2013.01)

(58) Field of Classification Search
  CPC ...... H01M 4/386; H01M 4/387; H01M 4/525; H01M 4/587; H01M 4/133; H01M 4/5825; H01M 2220/20; H01M 2220/30
  See application file for complete search history.

(56) References Cited

FOREIGN PATENT DOCUMENTS

| | | |
|---|---|---|
| JP | 11-130821 A | 5/1999 |
| JP | 11-297332 A | 10/1999 |
| JP | 2003-132877 A | 5/2003 |
| JP | 2003-257433 | 9/2003 |
| JP | 2003-257496 A | 9/2003 |
| JP | 2007-258160 | 10/2007 |
| JP | 2011-216242 A | 10/2011 |

\* cited by examiner

[FIG. 1]
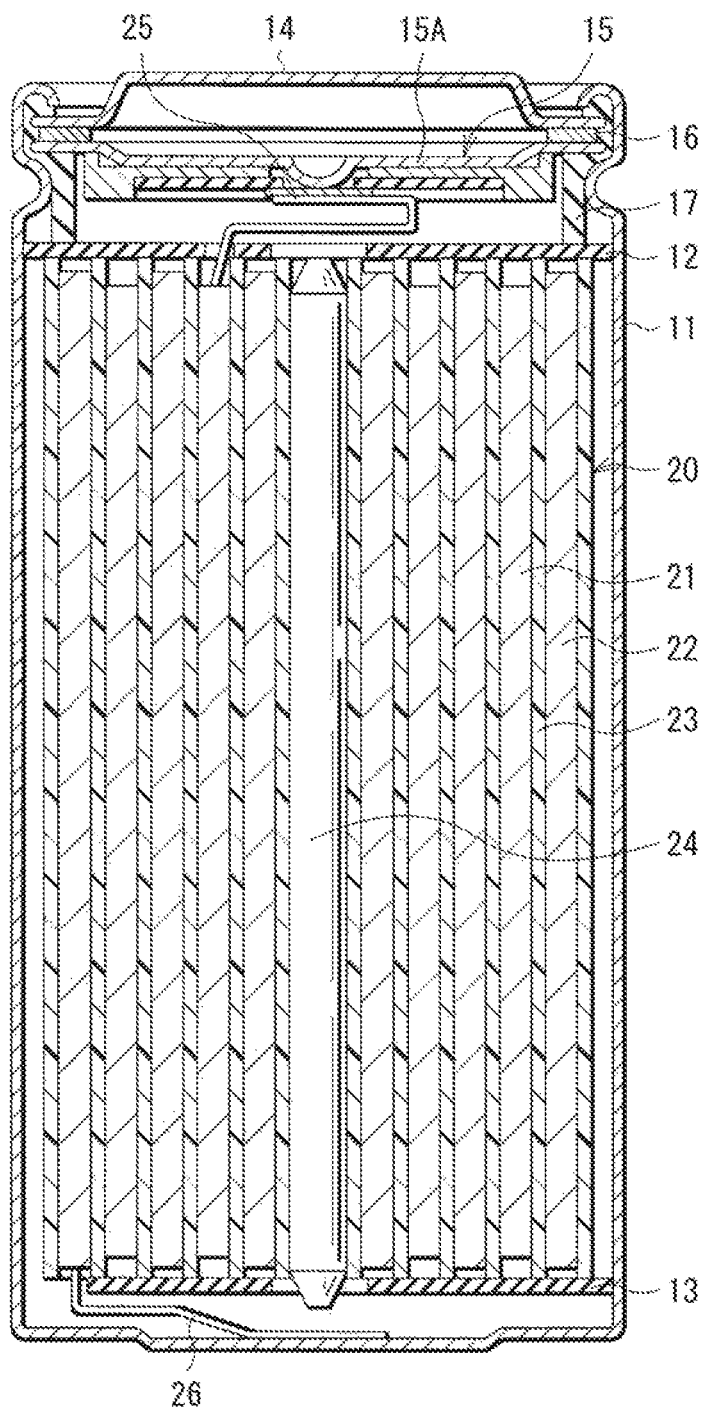

[ FIG. 2 ]
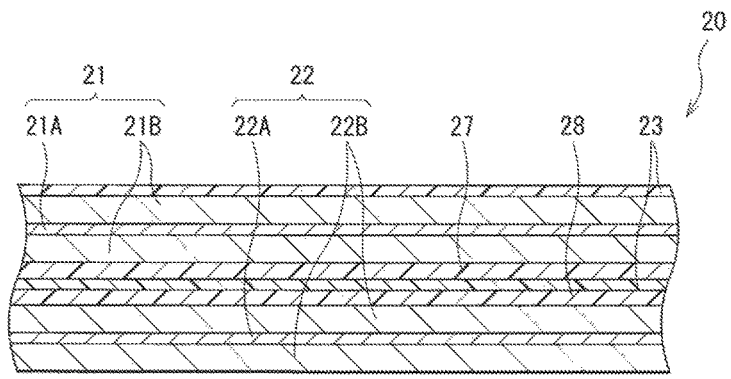
[ FIG. 3 ]
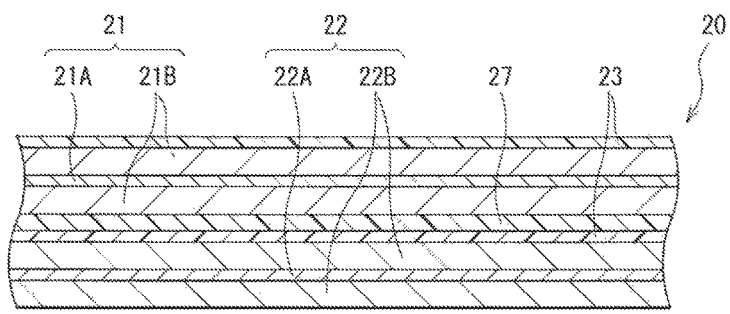
[ FIG. 4 ]
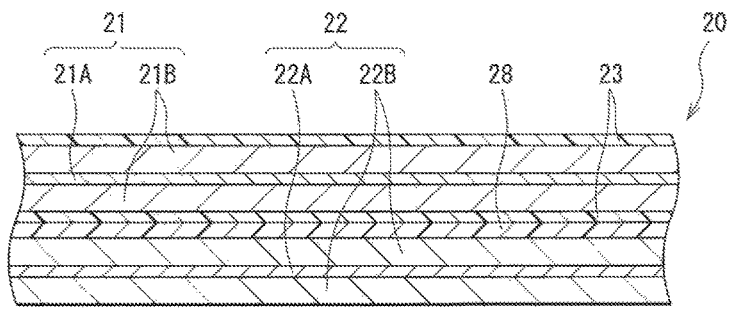

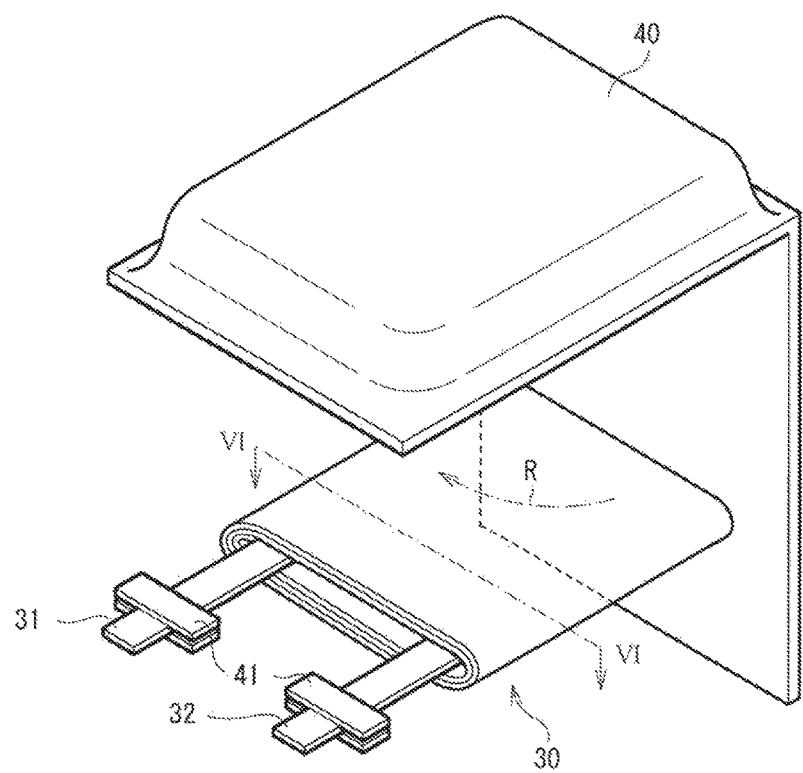
[FIG. 5]

[FIG. 6]
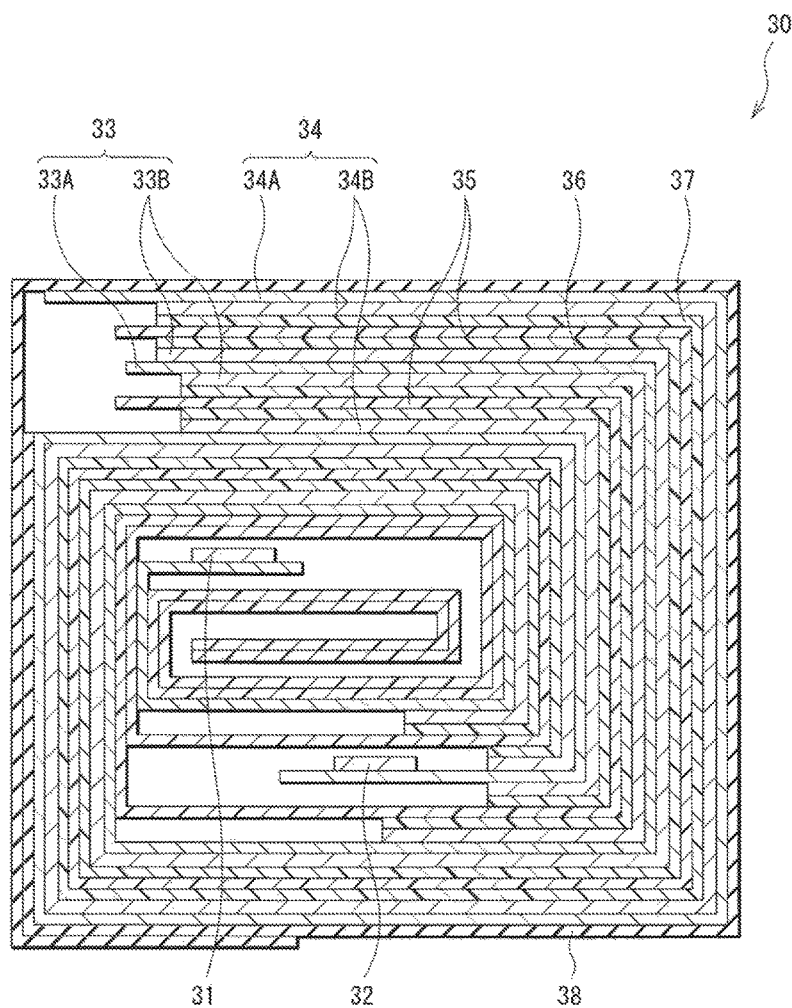

[ FIG. 7 ]
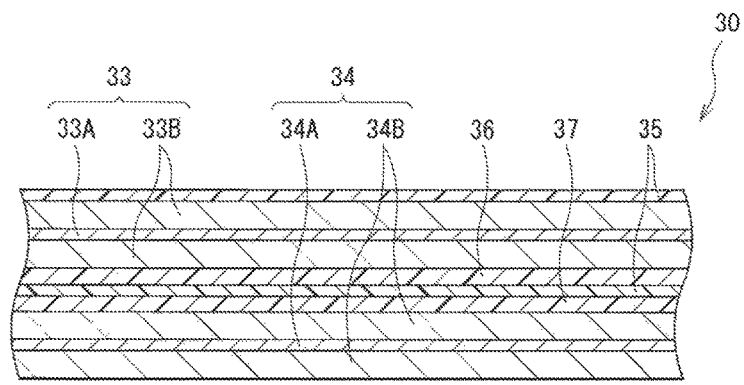
[ FIG. 8 ]
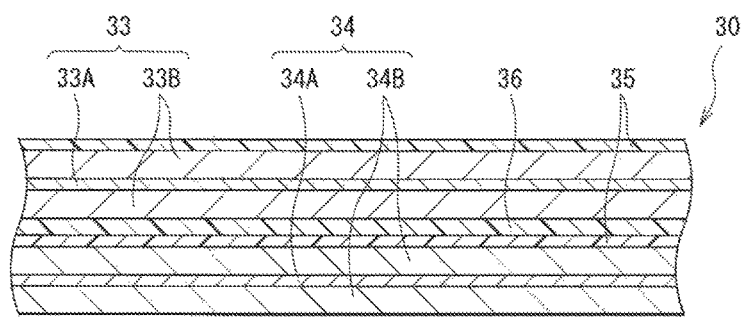
[ FIG. 9 ]
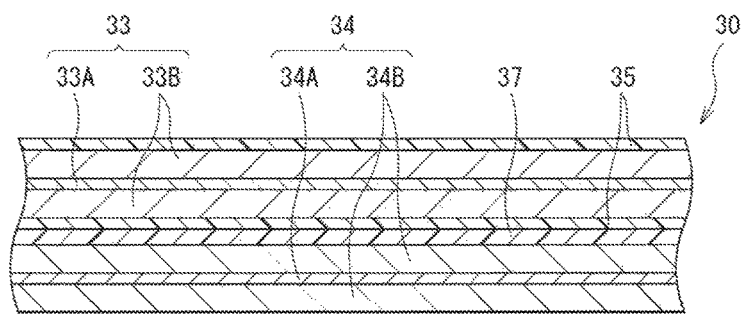

[FIG. 10]
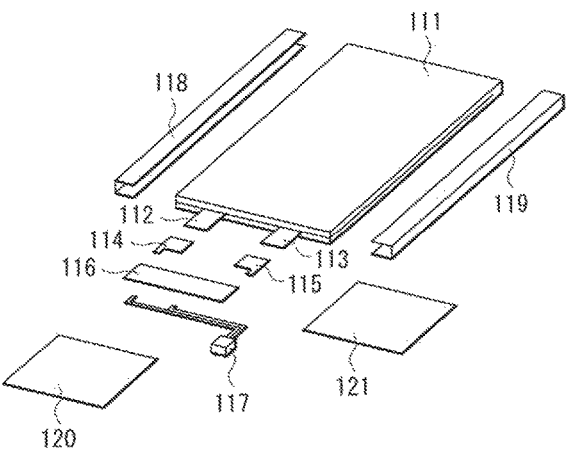
[FIG. 11]
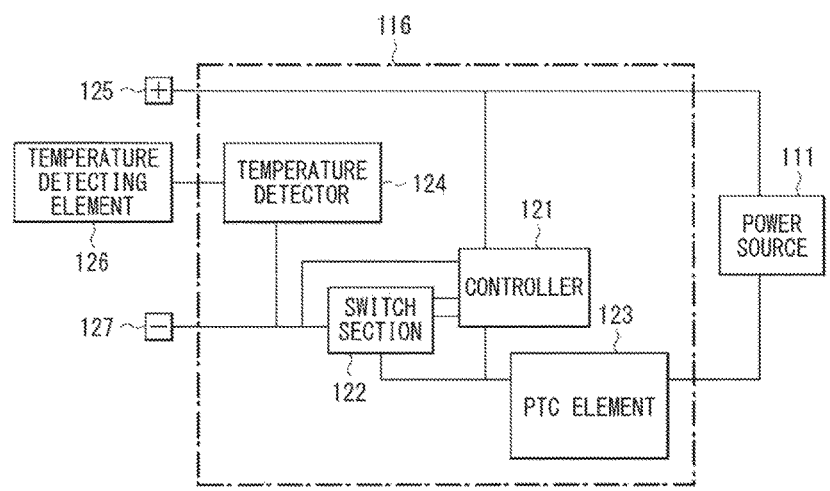

[ FIG. 12 ]
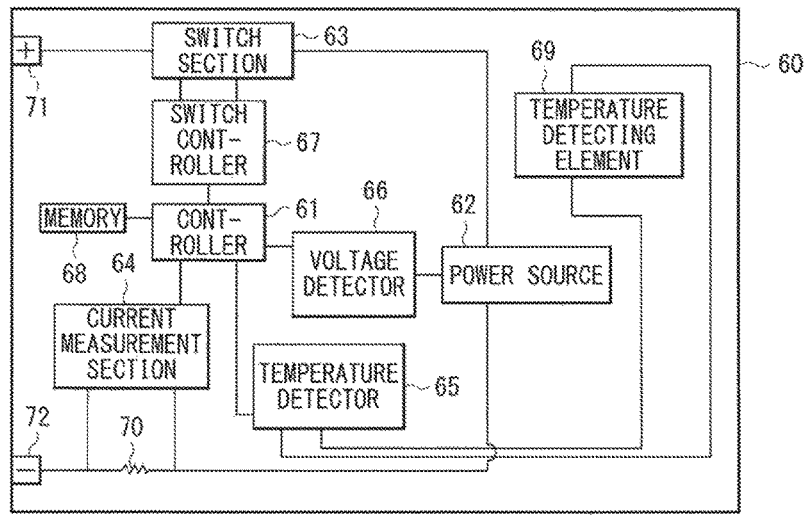
[ FIG. 13 ]
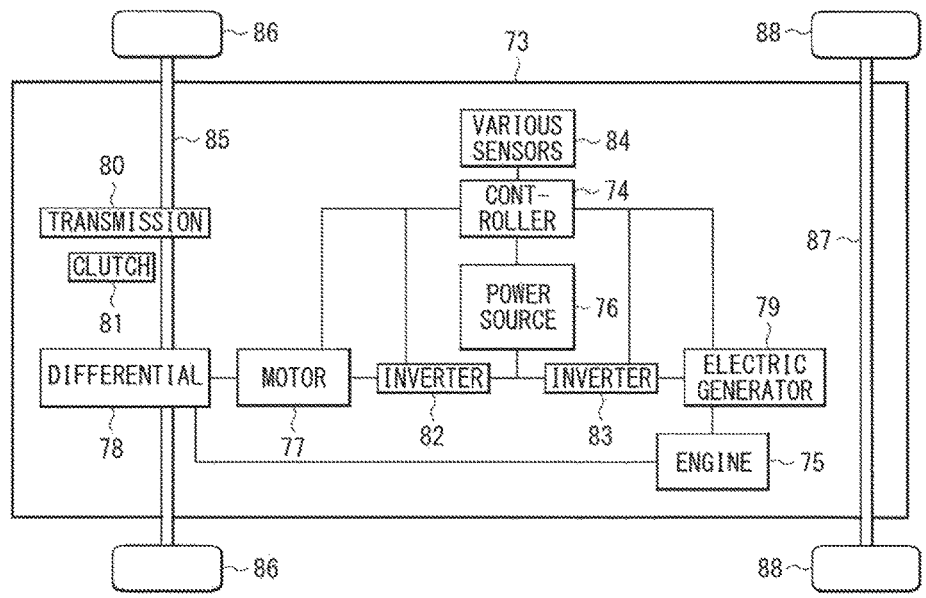

[ FIG. 14 ]
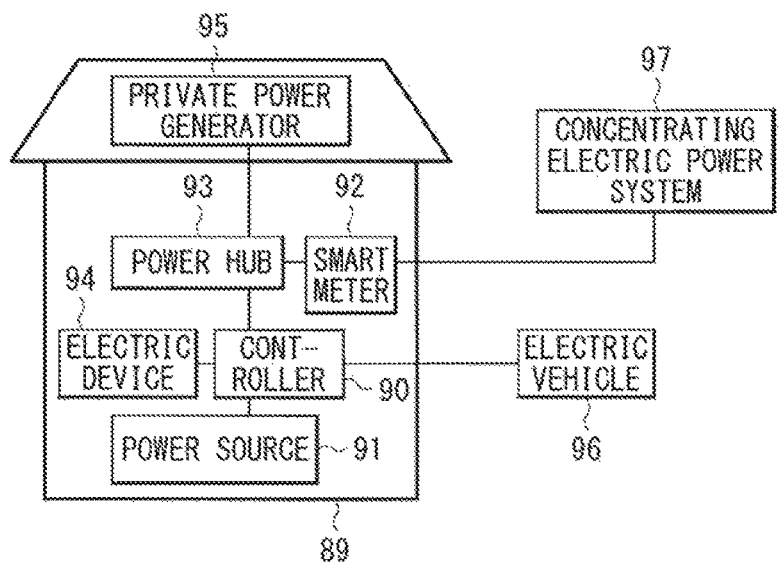
[ FIG. 15 ]
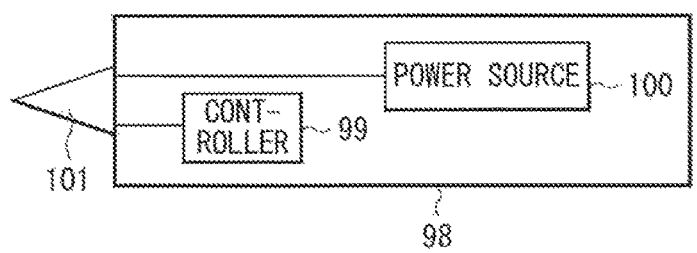

SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS REFERENCE TO RELATED APPLICATIONS

This application is a U.S. National Phase of International Patent Application No PCT/JP2015/072740 filed on Aug. 11, 2015, which claims priority benefit of Japanese Patent Application No. JP 2014-210083 filed in the Japan Patent Office on Oct. 14, 2014. Each of the above-referenced applications is hereby incorporated herein by reference in its entirety.

TECHNICAL FIELD

The present technology relates to a secondary battery including a cathode and an anode, a battery pack, an electric vehicle, an electric power storage system, an electric power tool, and an electronic apparatus each of which uses the secondary battery.

BACKGROUND ART

Various electronic apparatuses such as mobile phones and personal digital assistants (PDAs) have been widely used, and it has been demanded to further reduce size and weight of the electronic apparatuses and to achieve their longer lives. Accordingly, batteries, in particular, small and light-weight secondary batteries that have ability to achieve high energy density have been developed as power sources for the electronic apparatuses.

Applications of the secondary batteries are not limited to the electronic apparatuses described above, and it has been also considered to apply the secondary batteries to various other applications. Examples of such other applications may include: a battery pack attachably and detachably mounted on, for example, an electronic apparatus; an electric vehicle such as an electric automobile; an electric power storage system such as a home electric power server; and an electric power tool such as an electric drill.

There have been proposed secondary batteries that utilize various charge and discharge principles in order to obtain battery capacity. In particular, attention has been paid to a secondary battery that utilizes insertion and extraction of an electrode reactant and a secondary battery that utilizes precipitation and dissolution of an electrode reactant, which make it possible to achieve higher energy density than other batteries such as a lead-acid battery and a nickel-cadmium battery.

The secondary battery includes a cathode, an anode, and an electrolytic solution. The configuration of the secondary battery exerts a large influence on battery characteristics. Accordingly, various studies have been conducted on the configuration of the secondary battery.

More specifically, in order to improve, for example, ionic conductivity of a polymer solid electrolyte, a vinylidene fluoride-based copolymer is used as a polymer matrix (for example, refer to PTL 1). In order to improve heat resistance of a separator, an electrolyte layer contains insulating particles (for example, refer to PTL 2). In order to improve a pot life of a polymer solid electrolyte, a reactant such as an amino resin is used as a cross-linked resin (for example, refer to PTL 3).

CITATION LIST

Patent Literature

PTL 1: Japanese Unexamined Patent Application Publication No. H11-130821
PTL 2: Japanese Unexamined Patent Application Publication No. 2007-258160
PTL 3: Japanese Unexamined Patent Application Publication No. H03-012447

SUMMARY OF THE INVENTION

Electronic apparatuses and other apparatuses described above are more frequently used in association with higher performance and more multi-functionality thereof. Accordingly, secondary batteries tend to be frequently charged and discharged. For this reason, there is still room for improvement in battery characteristics of the secondary batteries.

It is therefore desirable to provide a secondary battery, a battery pack, an electric vehicle, an electric power storage system, an electric power tool, and an electronic apparatus each of which makes it possible to achieve superior battery characteristics.

A secondary battery according to an embodiment of the present technology includes: a cathode; an anode; and (1) a first polymer compound layer disposed between the cathode and the anode and being adjacent to the cathode, (2) a second polymer compound layer disposed between the cathode and the anode and being adjacent to the anode, or (3) the first polymer compound layer and the second polymer compound layer. One or both of the first polymer compound layer and the second polymer compound layer contain a polymer compound containing fluorine (F) as a constituent element and a conductive material dispersed in the polymer compound.

A battery pack, an electric vehicle, an electric power storage system, an electric power tool, and an electronic apparatus according to respective embodiments of the present technology each include a secondary battery, and the secondary battery has a configuration similar to that of the secondary battery according to the foregoing embodiment of the present technology.

The secondary battery according to the foregoing embodiment of the present technology may have one of three configurations described in (1) to (3). The secondary battery having the configuration (1) includes the cathode, the anode, and the first polymer compound layer. The secondary battery having the configuration (2) includes the cathode, the anode, and the second polymer compound layer. The secondary battery having the configuration (3) includes the cathode, the anode, the first polymer compound layer, and the second polymer compound layer.

According to the secondary battery of the embodiment of the present technology, the cathode, the anode, and one or both of the first polymer compound layer and the second polymer compound layer are included. This makes it possible to achieve superior battery characteristics. Moreover, in each of the battery pack, the electric vehicle, the electric power storage system, the electric power tool, and the electronic apparatus of the respective embodiment of the present technology, similar effects are achievable.

Note that effects described here are non-limiting. Effects achieved by the present technology may be one or more of effects described in the present technology.

BRIEF DESCRIPTION OF THE DRAWINGS

FIG. 1 is a cross-sectional view of a configuration of a secondary battery (cylindrical type) according to an embodiment of the present technology.

FIG. 2 is a cross-sectional view of part of a spirally wound electrode body illustrated in FIG. 1.

FIG. 3 is a cross-sectional view of a modification example 1 of a configuration of the spirally wound electrode body illustrated in FIG. 2.

FIG. 4 is a cross-sectional view of a modification example 2 of the configuration of the spirally wound electrode body illustrated in FIG. 2.

FIG. 5 is a perspective view of a configuration of another secondary battery (laminated film type) according to the embodiment of the present technology.

FIG. 6 is a cross-sectional view taken along a line VI-VI of a spirally wound electrode body illustrated in FIG. 5.

FIG. 7 is a cross-sectional view of a configuration of part of the spirally wound electrode body illustrated in FIG. 6.

FIG. 8 is a cross-sectional view of a modification example 1 of the configuration of the spirally wound electrode body illustrated in FIG. 7.

FIG. 9 is a cross-sectional view of a modification example 2 of the configuration of the spirally wound electrode body illustrated in FIG. 7.

FIG. 10 is a perspective view of a configuration of an application example (a battery pack: single battery) of the secondary battery.

FIG. 11 is a block diagram illustrating a configuration of the battery back illustrated in FIG. 10.

FIG. 12 is a block diagram illustrating a configuration of an application example (a battery back: assembled battery) of the secondary battery.

FIG. 13 is a block diagram illustrating a configuration of an application example (an electric vehicle) of the secondary battery.

FIG. 14 is a block diagram illustrating a configuration of an application example (an electric power storage system) of the secondary battery.

FIG. 15 is a block diagram illustrating a configuration of an application example (an electric power tool) of the secondary battery.

MODES FOR CARRYING OUT THE INVENTION

In the following, some embodiments of the present technology are described in detail with reference to the drawings. It is to be noted that description is given in the following order.

1. Secondary Battery
1-1. Lithium-ion Secondary Battery (Cylindrical Type)
   1-1-1. Basic Configuration
   1-1-2. Modification Example 1
   1-1-3. Modification Example 2
1-2. Lithium-ion Secondary Battery (Laminated Film Type)
   1-2-1. Basic Configuration
   1-2-2. Modification Example 1
   1-2-3. Modification Example 2
1-3. Lithium Metal Secondary Battery
2. Applications of Secondary Battery
2-1. Battery Pack (Single Battery)
2-2. Battery Pack (Assembled Battery)
2-3. Electric Vehicle
2-4. Electric Power Storage System
2-5. Electric Power Tool

1. SECONDARY BATTERY

First, description is given of a secondary battery according to an embodiment of the present technology.

1-1. LITHIUM-ION SECONDARY BATTERY (CYLINDRICAL TYPE)

FIG. 1 illustrates a cross-sectional configuration of a secondary battery. FIG. 2 illustrates a cross-sectional configuration of part of a spirally wound electrode body 20 illustrated in FIG. 1.

The secondary battery described here may be, for example, a lithium-ion secondary battery in which a capacity of an anode 22 is obtained by insertion and extraction of lithium (Li) as an electrode reactant.

1-1-1. BASIC CONFIGURATION

[Whole Configuration of Secondary Battery]

The secondary battery has a so-called cylindrical type battery configuration. The secondary battery may contain, for example, a pair of insulating plates 12 and 13 and the spirally wound electrode body 20 as a battery element inside a battery can 11 having a substantially hollow cylindrical shape, as illustrated in FIG. 1. In the spirally wound electrode body 20, for example, a cathode 21 and an anode 22 may be stacked with a separator 23 in between, and the cathode 21, the anode 22, and the separator 23 may be spirally wound. The spirally wound electrode body 20 may be impregnated with, for example, an electrolytic solution that is a liquid electrolyte.

The battery can 11 may have, for example, a hollow structure in which one end of the battery can 11 is closed and the other end of the battery can 11 is open. The battery can 11 may be made of one or more of, for example, iron (Fe), aluminum (Al), and an alloy thereof. It is to be noted that a surface of the battery can 11 may be plated with, for example, nickel. The pair of insulating plates 12 and 13 may be so disposed as to sandwich the spirally wound electrode body 20 in between and extend perpendicularly to a spirally wound periphery surface of the spirally wound electrode body 20.

At the open end of the battery can 11, a battery cover 14, a safety valve mechanism 15, and a positive temperature coefficient device (PTC device) 16 may be swaged with a gasket 17, by which the battery can 11 is hermetically sealed. The battery cover 14 may be made of, for example, a material similar to the material of the battery can 11. Each of the safety valve mechanism 15 and the PTC device 16 may be provided on the inner side of the battery cover 14, and the safety valve mechanism 15 may be electrically coupled to the battery cover 14 via the PTC device 16. In the safety valve mechanism 15, when an internal pressure of the battery can 11 reaches a certain level or higher as a result of, for example, internal short circuit or heating from outside, a disk plate 15A inverts. This cuts electric connection between the battery cover 14 and the spirally wound electrode body 20. In order to prevent abnormal heat generation resulting from a large current, resistance of the PTC device 16 increases as a temperature rises. The gasket 17 may be made of, for example, an insulating material. A surface of the gasket 17 may be coated with, for example, asphalt.

For example, a center pin 24 may be inserted in the center of the spirally wound electrode body 20. However, the center pin 24 may not be inserted in the center of the spirally wound electrode body 20. A cathode lead 25 may be attached to the cathode 21, and an anode lead 26 may be attached to the anode 22. The cathode lead 25 may be made of, for example, a conductive material such as aluminum. For example, the cathode lead 25 may be attached to the safety valve mechanism 15, and may be electrically coupled to the battery cover 14. The anode lead 26 may be made of, for example, a conductive material such as nickel. For example, the anode lead 26 may be attached to the battery can 11, and may be electrically coupled to the battery can 11.

[Cathode]

The cathode 21 may include, for example, a cathode current collector 21A and a cathode active material layer 21B provided on both surfaces of the cathode current collector 21, as illustrated in FIG. 2. Alternatively, the cathode active material layer 21B may be provided on a single surface of the cathode current collector 21A.

The cathode current collector 21A may be made of, for example, one or more of conductive materials. The kind of the conductive material is not particularly limited, but may be, for example, a metal material such as aluminum (Al), nickel (Ni), and stainless steel. The cathode current collector 21A may be configured of a single layer or may be configured of multiple layers.

The cathode active material layer 21B may contain, as a cathode active material, one or more of cathode materials that have ability to insert and extract lithium. It is to be noted that the cathode active material layer 21B may further contain one or more of other materials such as a cathode binder and a cathode conductor, in addition to the cathode active material.

The cathode material may be preferably a lithium-containing compound. More specifically, the cathode material may be preferably one or both of a lithium-containing composite oxide and a lithium-containing phosphate compound, which make it possible to achieve high energy density.

The lithium-containing composite oxide is an oxide that contains lithium and one or more elements that exclude lithium (hereinafter, referred to as "other elements") as constituent elements, and may have, for example, one or more of crystal structures such as a layered rock-salt crystal structure and a spinel crystal structure. The lithium-containing phosphate compound is a phosphate compound that contains lithium and one or more of the other elements as constituent elements, and may have, for example, one or more of crystal structures such as an olivine crystal structure.

The kinds of the other elements are not particularly limited, as long as the other elements are one or more of any elements. In particular, the other elements may be preferably one or more of elements that belongs to Groups 2 to 15 in the long form of the periodic table of the elements. More specifically, the other elements may more preferably include one or more of nickel (Ni), cobalt (Co), manganese (Mn), and iron (Fe), which make it possible to obtain a high voltage.

Examples of the lithium-containing composite oxide having the layered rock-salt crystal structure may include compounds represented by the following formulas (1) to (3).

where M1 is one or more of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten(W), "a" to "e" satisfy $0.8 \le a \le 1.2$, $0 < b < 0.5$, $0 \le c \le 0.5$, $(b+c) < 1$, $-0.1 \le d \le 0.2$, and $0 \le e \le 0.1$, it is to be noted that the composition of lithium varies depending on charge and discharge states, and "a" is a value in a completely-discharged state.

where M2 is one or more of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.8 \le a \le 1.2$, $0.005 \le b \le 0.5$, $-0.1 \le c \le 0.2$, and $0 \le d \le 0.1$, it is to be noted that the composition of lithium varies depending on charge and discharge states, and "a" is a value in a completely-discharged state.

where M3 is one or more of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.8 \le a \le 1.2$, $0 \le b < 0.5$, $-0.1 \le c \le 0.2$, and $0 \le d \le 0.1$, it is to be noted that the composition of lithium varies depending on charge and discharge states, and "a" is a value in a completely-discharged state.

Specific examples of the lithium-containing composite oxide having the layered rock-salt crystal structure may include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$.

It is to be noted that in a case in which the lithium-containing composite oxide having the layered rock-salt crystal structure includes nickel, cobalt, manganese, and aluminum as constituent elements, an atomic ratio of nickel may be preferably 50 at % or more, which makes it possible to achieve high energy density.

Examples of the lithium-containing composite oxide having the spinel crystal structure may include a compound represented by the following formula (4).

where M4 is one or more of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.9 \le a \le 1.1$, $0 \le b \le 0.6$, $3.7 \le c \le 4.1$, and $0 \le d \le 0.1$, it is to be noted that the composition of lithium varies depending on charge and discharge states, and "a" is a value in a completely-discharged state.

Specific examples of the lithium-containing composite oxide having the spinel crystal structure may include $LiMn_2O_4$.

Examples of the lithium-containing phosphate compound having the olivine crystal structure may include a compound represented by the following formula (5).

where M5 is one or more of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr), "a" satisfies $0.9 \le a \le 1.1$, it is to be noted that the composition of lithium varies depending on charge and discharge states, and "a" is a value in a completely-discharged state.

Specific examples of the lithium-containing phosphate compound having the olivine crystal structure may include LiFePO$_4$, LiMnPO$_4$, LiFe$_{0.5}$Mn$_{0.5}$PO$_4$, and LiFe$_{0.3}$Mn$_{0.7}$PO$_4$.

It is to be noted that the lithium-containing composite oxide may be, for example, a compound represented by the following formula (6).

(Li$_2$MnO$_3$)$_x$(LiMnO$_2$)$_{1-x}$              (6)

where "x" satisfies 0≤x≤1, it is to be noted that the composition of lithium varies depending on charge and discharge states, and "x" is a value in a completely-discharged state.

In addition, the cathode material may be, for example, one or more of an oxide, a disulfide, a chalcogenide, and a conductive polymer. Examples of the oxide may include titanium oxide, vanadium oxide, and manganese dioxide. Examples of the disulfide may include titanium disulfide and molybdenum sulfide. Examples of the chalcogenide may include niobium selenide. Examples of the conductive polymer may include sulfur, polyaniline, and polythiophene.

It goes without saying that the cathode material is not limited to the foregoing materials, and may be a material other than the foregoing materials.

The cathode binder may contain one or more of, for example, synthetic rubbers and polymer materials. Examples of the synthetic rubbers may include a styrene-butadiene-based rubber, a fluorine-based rubber, and ethylene propylene diene. Examples of the polymer material may include polyvinylidene fluoride and polyimide.

The cathode conductor may contain one or more of, for example, carbon materials. Examples of the carbon materials may include graphite, carbon black, acetylene black, and Ketjen black. Alternatively, the cathode conductor may be any other material such as a metal material and a conductive polymer, as long as the cathode conductor is a material having conductivity.

[Anode]

The anode 22 may include, for example, an anode current collector 22A and an anode active material layer 22B provided on both surfaces of the anode current collector 22A, as illustrated in FIG. 2. Alternatively, the anode active material layer 22B may be provided on a single surface of the anode current collector 22A.

The anode current collector 22A may be made of, for example, one or more of conductive materials. The kind of the conductive material is not particularly limited, but may be, for example, a metal material such as copper (Cu), aluminum (Al), nickel (Ni), and stainless steel. The anode current collector 22A may be configured of a single layer or may be configured of multiple layers.

A surface of the anode current collector 22A may be preferably roughened. This makes it possible to improve adhesibility of the anode active material layer 22B with respect to the anode current collector 22A by a so-called anchor effect. In this case, it may be only necessary to roughen the surface of the anode current collector 22A at least in a region facing the anode active material layer 22B. Examples of a roughening method may include a method of forming fine particles with use of electrolytic treatment. Through the electrolytic treatment, fine particles are formed on the surface of the anode current collector 22A in an electrolytic bath by an electrolytic method to make the surface of the anode current collector 22A rough. A copper foil fabricated by the electrolytic method is generally called "electrolytic copper foil".

The anode active material layer 22B contains, as an anode active material, one or more of anode materials that have ability to insert and extract lithium. It is to be noted that the anode active material layer 22B may further contain one or more of other materials such as an anode binder and an anode conductor, in addition to the anode active material.

In order to prevent lithium metal from being unintentionally precipitated on the anode 22 in the middle of charge, chargeable capacity of the anode material may be preferably larger than discharge capacity of the cathode 21. In other words, electrochemical equivalent of the anode material that has ability to insert and extract lithium may be preferably larger than electrochemical equivalent of the cathode 21.

The anode material may be, for example, one or more of carbon materials. The carbon material causes an extremely-small change in a crystal structure thereof during insertion and extraction of lithium, which stably achieves high energy density. Further, the carbon material also serves as the anode conductor, which improves conductivity of the anode active material layer 22B.

Examples of the carbon material may include graphitizable carbon, nongraphitizable carbon, and graphite. A spacing of (002) plane in the nongraphitizable carbon may be preferably 0.37 nm or larger, and a spacing of (002) plane in the graphite may be preferably 0.34 nm or smaller. More specific examples of the carbon material may include pyrolytic carbons, cokes, glassy carbon fibers, an organic polymer compound fired body, activated carbon, and carbon blacks. Examples of the cokes may include pitch coke, needle coke, and petroleum coke. The organic polymer compound fired body is a fired (carbonized) body of a polymer compound such as phenol resin and furan resin. A firing temperature of the fired body is not particularly limited. Other than the materials mentioned above, the carbon material may be low crystalline carbon that is subjected to heat treatment at a temperature of about 1000° C. or lower, or may be amorphous carbon. It is to be noted that a shape of the carbon material may be one or more of a fibrous shape, a spherical shape, a granular shape, and a scale-like shape.

Moreover, the anode material may be, for example, a material (a metal-based material) that contains one or more of metal elements and metalloid elements as constituent elements. This makes it possible to achieve high energy density.

The metal-based material may be any of a simple substance, an alloy, or a compound, may be two or more thereof, or may have one or more phases thereof at least in part. It is to be noted that the "alloy" also encompasses a material that contains one or more metal elements and one or more metalloid elements, in addition to a material that is configured of two or more metal elements. Further, the "alloy" may contain one or more of nonmetallic elements. Examples of a structure of the metal-based material may include a solid solution, a eutectic crystal (a eutectic mixture), an intermetallic compound, and a structure in which two or more thereof coexist.

The metal elements and the metalloid elements mentioned above may be, for example, one or more of metal elements and metalloid elements that are able to form an alloy with lithium. Specific examples thereof may include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc, hafnium (Hf), zirconium, yttrium (Y), palladium (Pd), and platinum (Pt).

In particular, silicon, tin, or both may be preferable. Silicon and tin have superior ability to insert and extract lithium, and achieve remarkably high energy density accordingly.

A material that contains silicon, tin, or both as constituent elements may be any of a simple substance, an alloy, and a compound of silicon, may be any of a simple substance, an alloy, and a compound of tin, may be two or more thereof, or may be a material that has one or more phases thereof at least in part. The simple substance described here merely refers to a simple substance in a general sense (in which a small amount of impurity may be contained), and does not necessarily refer to a simple substance having a purity of 100%.

The alloy of silicon may contain, for example, one or more of elements such as tin, nickel, copper, iron, cobalt, manganese, zinc, indium, silver, titanium, germanium, bismuth, antimony, and chromium, as constituent elements other than silicon. The compound of silicon may contain, for example, one or more of elements such as carbon and oxygen, as constituent elements other than silicon. It is to be noted that the compound of silicon may contain, for example, one or more of the elements described related to the alloy of silicon, as constituent elements other than silicon.

Specific examples of the alloy of silicon and the compound of silicon may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq 2$), and LiSiO. It is to be noted that "v" in $SiO_v$ may be, for example, in a range of $0.2<v<1.4$.

The alloy of tin may contain, for example, one or more of elements such as silicon, nickel, copper, iron, cobalt, manganese, zinc, indium, silver, titanium, germanium, bismuth, antimony, and chromium, as constituent elements other than tin. The compound of tin may contain, for example, one or more of elements such as carbon and oxygen, as constituent elements other than tin. It is to be noted that the compound of tin may contain, for example, one or more of the elements described related to the alloy of tin, as constituent elements other than tin.

Specific examples of the alloy of tin and the compound of tin may include $SnO_w$ ($0<w\leq 2$), $SnSiO_3$, LiSnO, and $Mg_2Sn$.

In particular, the material that contains tin (a first constituent element) as a constituent element may be preferably, for example, a material that contains, together with tin, a second constituent element and a third constituent element. The second constituent element may include, for example, one or more of elements such as cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth, and silicon. The third constituent element may include, for example, one or more of elements such as boron, carbon, aluminum, and phosphorus (P). The Sn-containing material containing the second constituent element and the third constituent element makes it possible to achieve, for example, high battery capacity and superior cycle characteristics.

In particular, the Sn-containing material may be preferably a material (a SnCoC-containing material) that contains tin, cobalt, and carbon as constituent elements. In the SnCoC-containing material, for example, a content of carbon may be from 9.9 mass % to 29.7 mass % both inclusive, and a ratio of contents of tin and cobalt (Co/(Sn+Co)) may be from 20 mass % to 70 mass % both inclusive. This makes it possible to achieve high energy density.

The SnCoC-containing material may preferably have a phase that contains tin, cobalt, and carbon. Such a phase may be preferably low crystalline or amorphous. This phase is a reaction phase that is able to react with lithium. Hence, existence of the reaction phase results in achievement of superior characteristics. A half width (a diffraction angle $2\theta$) of a diffraction peak obtained by X-ray diffraction of this reaction phase may be preferably 1° or larger in a case where a CuKα ray is used as a specific X-ray, and an insertion rate is 1°/min. This makes it possible to insert and extract lithium more smoothly, and to decrease reactivity with the electrolytic solution. It is to be noted that, in some cases, the SnCoC-containing material may include a phase that contains simple substances of the respective constituent elements or part thereof in addition to the low-crystalline phase or the amorphous phase.

Comparison between X-ray diffraction charts before and after an electrochemical reaction with lithium makes it possible to easily determine whether the diffraction peak obtained by the X-ray diffraction corresponds to the reaction phase that is able to react with lithium. For example, if a position of the diffraction peak after the electrochemical reaction with lithium is changed from the position of the diffraction peak before the electrochemical reaction with lithium, the obtained diffraction peak corresponds to the reaction phase that is able to react with lithium. In this case, for example, the diffraction peak of the low-crystalline reaction phase or the amorphous reaction phase is seen in a range of $2\theta$ that is from 20° to 50° both inclusive. Such a reaction phase may include, for example, the respective constituent elements mentioned above, and it may be considered that such a reaction phase has become low crystalline or amorphous mainly because of existence of carbon.

In the SnCoC-containing material, part or all of carbon that is the constituent element thereof may be preferably bound to one or both of a metal element and a metalloid element that are other constituent elements thereof. Binding part or all of carbon suppresses cohesion or crystallization of, for example, tin. It is possible to confirm a binding state of the elements, for example, by X-ray photoelectron spectroscopy (XPS). In a commercially-available apparatus, for example, an Al—Kα ray or a Mg—Kα ray may be used as a soft X-ray. In a case in which part or all of carbon is bound to one or both of the metal element and the metalloid element, a peak of a synthetic wave of 1 s orbit of carbon (C1s) appears in a region lower than 284.5 eV. It is to be noted that energy calibration is so made that a peak of 4f orbit of a gold atom (Au4f) is obtained at 84.0 eV. In this case, in general, surface contamination carbon exists on the material surface. Hence, a peak of C1s of the surface contamination carbon is regarded to be at 284.8 eV, and this peak is used as energy standard. In XPS measurement, a waveform of the peak of C1s is obtained as a form that includes the peak of the surface contamination carbon and the peak of the carbon in the SnCoC-containing material. The two peaks may be therefore separated from each other, for example, by analysis with use of commercially-available software. In the analysis of the waveform, a position of the main peak that exists on the lowest bound energy side is regarded as the energy standard (284.8 eV).

The SnCoC-containing material is not limited to a material (SnCoC) that contains only tin, cobalt, and carbon as constituent elements. The SnCoC-containing material may further contain one or more of, for example, silicon, iron, nickel, chromium, indium, niobium, germanium, titanium, molybdenum, aluminum, phosphorus, gallium, and bismuth, as constituent elements, in addition to tin, cobalt, and carbon.

Other than the SnCoC-containing material, a material (a SnCoFeC-containing material) that contains tin, cobalt, iron, and carbon as constituent elements may be also preferable. Any composition of the SnCoFeC-containing material may be adopted. To give an example, in a case where a content of iron is set smaller, a content of carbon may be from 9.9 mass % to 29.7 mass % both inclusive, a content of iron may be from 0.3 mass % to 5.9 mass % both inclusive, and a ratio of contents of tin and cobalt (Co/(Sn+Co)) may be from 30 mass % to 70 mass % both inclusive. Alternatively, in a case where the content of iron is set larger, the content of carbon may be from 11.9 mass % to 29.7 mass % both inclusive, the ratio of contents of tin, cobalt, and iron ((Co+Fe)/(Sn+Co+Fe)) may be from 26.4 mass % to 48.5 mass % both inclusive, and the ratio of contents of cobalt and iron (Co/(Co+Fe)) may be from 9.9 mass % to 79.5 mass % both inclusive. Such composition ranges allow for achievement of high energy density. It is to be noted that physical characteristics (such as a half width) of the SnCoFeC-containing material are similar to physical characteristics of the foregoing SnCoC-containing material.

Other than the materials mentioned above, the anode material may be one or more of, for example, a metal oxide and a polymer compound. Examples of the metal oxide may include iron oxide, ruthenium oxide, and molybdenum oxide. Examples of the polymer compound may include polyacetylene, polyaniline, and polypyrrole.

In particular, the anode material may preferably contain both the carbon material and the metal-based material for the following reason.

The metal-based material, in particular, the material containing one or both of silicon and tin as constituent elements has a concern that such a material is easily and radically expanded or contracted during charge and discharge, whereas such a material has an advantage of high theoretical capacity. In contrast, the carbon material has an advantage that the carbon material is less prone to be expanded or contracted during charge and discharge, whereas the carbon material has a concern of low theoretical capacity. Hence, using both of the carbon material and the metal-based material makes it possible to suppress expansion and contraction during charge and discharge while achieving high theoretical capacity (in other words, high battery capacity).

The anode active material layer 22B may be formed by, for example, one or more of a coating method, a vapor-phase method, a liquid-phase method, a spraying method, and a firing method (sintering method). The coating method may be, for example, a method in which, after a particulate (powder) anode active material is mixed with, for example, an anode binder, the mixture is dispersed in a solvent such as an organic solvent, and the resultant is applied onto the anode current collector 22A. Examples of the vapor-phase method may include a physical deposition method and a chemical deposition method. More specifically, examples thereof may include a vacuum evaporation method, a sputtering method, an ion plating method, a laser ablation method, a thermal chemical vapor deposition method, a chemical vapor deposition (CVD) method, and a plasma chemical vapor deposition method. Examples of the liquid-phase method may include an electrolytic plating method and an electroless plating method. The spraying method is a method in which an anode active material in a fused state or a semi-fused state is sprayed to the anode current collector 22A. The firing method may be, for example, a method in which, after the mixture dispersed in, for example, the solvent is applied onto the anode current collector 22A by the coating method, the resultant is subjected to heat treatment at a temperature higher than a melting point of, for example, the anode binder. For example, one or more of firing methods such as an atmosphere firing method, a reactive firing method, and a hot press firing method may be employed as the firing method.

In the secondary battery, as described above, in order to prevent lithium metal from being unintentionally precipitated on the anode 22 in the middle of charge, the electrochemical equivalent of the anode material that has ability to insert and extract lithium may be preferably larger than the electrochemical equivalent of the cathode. Moreover, in a case in which an open circuit voltage (that is, a battery voltage) in a completely-charged state is 4.25 V or higher, an extraction amount of lithium per unit mass is larger than that in a case in which the open circuit voltage is 4.20 V, even if the same cathode active material is used. Hence, amounts of the cathode active material and the anode active material are adjusted in accordance therewith. As a result, high energy density is achieved.

[Cathode-Side Polymer Compound Layer and Anode-Side Polymer Compound Layer]

For example, a cathode-side polymer compound layer 27 (a first polymer compound layer) and an anode-side polymer compound layer 28 (a second polymer compound layer) may be provided between the cathode 21 and the anode 22. The cathode-side polymer compound layer 27 is adjacent to the cathode 21, and the anode-side polymer compound layer 28 is adjacent to the anode 22.

Herein, for example, a separator 23 may be provided between the cathode-side polymer compound layer 27 and the anode-side polymer compound layer 28, as illustrated in FIG. 2. This causes to separate the cathode-side polymer compound layer 27 and the anode-side polymer compound layer 28 from each other with the separator 23 in between. Thicknesses of the cathode-side polymer compound layer 27 and the anode-side polymer compound layer 28 are not particularly limited, but may be, for example, from 0.1 μm to 15 μm both inclusive.

One or both of the cathode-side polymer compound layer 27 and the anode-side polymer compound layer 28 contain one or more of polymer compounds and one or more of conductive materials.

The polymer compound contains fluorine (F) as a constituent element, which has physical strength and is electrochemically stable.

The kind of the polymer compound is not particularly limited, as long as the polymer compound is a polymer containing fluorine as a constituent element. In particular, the polymer compound may preferably contain one or more of a homopolymer of vinylidene fluoride and a copolymer of vinylidene fluoride. Such a polymer compound makes it possible to achieve superior physical strength and superior electrochemical stability.

The "homopolymer" is a polymer containing one monomer as a polymerization component. The homopolymer of vinylidene fluoride is polyvinylidene fluoride.

The "copolymer" is a polymer containing two or more monomers as polymerization components. The kind of a monomer forming a copolymer with vinylidene fluoride is not particularly limited, but examples of the monomer may include hexafluoropropylene, chlorotrifluoroethylene, tetrafluoroethylene, and monomethyl maleic acid. Specific examples of the copolymer of vinylidene fluoride may include a copolymer of vinylidene fluoride and hexafluoropropylene, and a copolymer of vinylidene fluoride, hexafluoropropylene, and chlorotrifluoroethylene. Contents (copolymerization amounts) of respective polymerization components in the copolymer are not particularly limited.

It is to be noted that the polymer compound may contain one or more of other homopolymers and other copolymers, together with one or more of the homopolymer of vinylidene fluoride and the copolymer of vinylidene fluoride. The "other homopolymers" described here are homopolymers not containing fluorine as a constituent element, and the "other copolymers" are copolymers not containing fluorine as a constituent element.

Specific examples of the other homopolymers may include polyacrylonitrile, polyethylene oxide, polypropylene oxide, polyphosphazene, polysiloxane, polyvinyl acetate, polyvinyl alcohol, poly(methyl methacrylate), polyacrylic acid, polymethacrylic acid, styrene-butadiene rubber, nitrile-butadiene rubber, polystyrene, and polycarbonate.

Specific examples of the other copolymers may include a copolymer containing two or more of the foregoing specific examples of the other homopolymers.

The kind of the conductive material is not particularly limited, as long as the conductive material is a material having conductivity. In particular, the conductive material may be preferably a carbon material, which is electrochemically stable and has high electrical conductivity.

The conductive material may take, for example, the form of a plurality of particles, and may be dispersed in the polymer compound. Note that the "particle form" described here encompasses not only a spherical form (including a substantially spherical form) but also a massive form, a flat-plate form, and a fiber form. Presence of a plurality of conductive materials makes it possible to disperse the plurality of conductive materials in the polymer compound independently of the form.

Specific examples of the conductive material in the spherical form may include carbon blacks, acetylene black, and ketjen black. Specific examples of the conductive material in the fiber form may include carbon nanotubes and vapor grown carbon fibers (VGCF).

A mixture ratio (weight ratio) of the polymer compound and the conductive material is not particularly limited. In particular, a ratio of a weight of the conductive material with respect to a weight of the polymer compound (the weight of the conductive material/the weight of the polymer compound) may be preferably 1/1000 to 4/1. This makes it possible to easily and stably form the cathode-side polymer compound layer 27 and the anode-side polymer compound layer 28, and to achieve sufficient electrical conductivity.

More specifically, when the ratio is smaller than 1/1000, an absolute amount of the conductive material is insufficient. Accordingly, in each of the cathode-side polymer compound layer 27 and the anode-side polymer compound layer 28, it is difficult to form a conductive path (electronic conductive path) by the conductive material. Accordingly, there is a possibility that electrical conductivity of each of the cathode-side polymer compound layer 27 and the anode-side polymer compound layer 28 is not sufficiently high. In contrast, when the ratio is larger than 4/1, the absolute amount of the conductive material is excessive. Accordingly, there is a possibility that the conductive material is not sufficiently dispersed in each of the cathode-side polymer compound layer 27 and the anode-side polymer compound layer 28.

As described above, the conductive material is dispersed in each of the cathode-side polymer compound layer 27 and the anode-side polymer compound layer 28; however, the distribution of the conductive material is not particularly limited. More specifically, the conductive material may be distributed uniformly or non-uniformly in a thickness direction of each of the cathode-side polymer compound layer 27 and the anode-side polymer compound layer 28.

To give an example using the cathode-side polymer compound layer 27, a case in which the conductive material is non-uniformly dispersed in the cathode-side polymer compound layer 27 may be, for example, a case in which the amount of the conductive material is gradually decreased from side close to the cathode 21 to side far from the cathode 21. In this case, the amount of the conductive material is maximum in proximity to an interface between the cathode-side polymer compound layer 27 and the cathode 21, which makes it easy to improve electrical conductivity between the cathode-side polymer compound layer 27 and the cathode 21.

The cathode-side polymer compound layer 27 and the anode-side polymer compound layer 28 are provided between the cathode 21 and the anode 22 for the following reasons.

Firstly, an improvement in adhesibility of the separator 23 with respect to each of the cathode 21 and the anode 22 is achieved, thereby suppressing deformation of the spirally wound electrode body 20. This makes it possible to suppress decomposition reaction of the electrolytic solution and to suppress liquid leakage of the electrolytic solution with which the separator 23 is impregnated. Accordingly, even if charge and discharge are repeated, resistance is less prone to increase, and battery swollenness is suppressed.

Secondly, a conductive path is formed by the conductive material in each of the cathode-side polymer compound layer 27 and the anode-side polymer compound layer 28. This makes it possible to secure electrical conductivity between the cathode 21 and the anode 22 even if the cathode-side polymer compound layer 27 and the anode-side polymer compound layer 28 are interposed between the cathode 21 and the anode 22. Moreover, even if the anode active material layer 22B is expanded and contracted during charge and discharge, a conductive network including the anode active material is maintained by the conductive path; therefore, the anode active material is less prone to be electrically isolated. Accordingly, even if charge and discharge are repeated, a decline in electrical conductivity is suppressed, and the discharge capacity is less prone to decrease.

Thirdly, even if lithium is unintentionally precipitated on the anode 22 during charge and discharge, the precipitated lithium is easily re-fused. Accordingly, even if charge and discharge are repeated, occurrence of electrical short circuit is suppressed, and the discharge capacity is less prone to decrease.

These three advantages are remarkably achieved specifically in a case in which the secondary battery is used in a severe environment such as a low-temperature environment.

It is to be noted that one or both of the cathode-side polymer compound layer 27 and the anode-side polymer compound layer 28 may contain one or more of other materials, together with the polymer compound and the conductive material mentioned above.

Examples of the other materials may include an insulating material, which makes it possible to improve heat resistance of the secondary battery.

As described above, the insulating material may be contained only in the cathode-side polymer compound layer 27, only in the anode-side polymer compound layer 28, or in both the cathode-side polymer compound layer 27 and the anode-side polymer compound layer 28.

The insulating material may take the form of a plurality of particles, and may be dispersed in the polymer compound together with the conductive material. The definition of the "particle form" relating to the insulating material is similar to the definition of the "particle form" relating to the foregoing conductive material. It is to be noted that an amount of the insulating material dispersed in the polymer compound is not particularly limited.

Examples of the insulating material may include metal oxides and metal nitrides. Specific examples of the metal oxides may include aluminum oxide ($Al_2O_3$) and titanium oxide ($TiO_2$). Specific examples of the metal nitrides may include aluminum nitride (AlN).

It is to be noted that a method of confirming, for example, the presence or absence and a configuration of each of the cathode-side polymer compound layer 27 and the anode-side polymer compound layer 28 may be as follows. In the following, description is given with reference to an example using the cathode-side polymer compound layer 27.

In order to confirm the presence or absence of the cathode-side polymer compound layer 27, for example, the spirally wound electrode body 20 may be cut, and thereafter a cross-section (FIG. 2) of the spirally wound electrode body 20 may be observed with use of a microscope. This makes it possible to identify whether the cathode-side polymer compound layer 27 is interposed between the cathode 21 and the separator 23. It is to be noted that examples of the microscope may include one or more of an optical microscope and an electron microscope.

In order to confirm the presence or absence of the conductive material contained in the cathode-side polymer compound layer 27, for example, as with the case in which the presence or absence of the cathode-side polymer compound layer 27 is confirmed, the cross-section of the spirally wound electrode body 20 may be observed with use of a microscope. This makes it possible to identify whether a plurality of conductive materials are dispersed in the cathode-side polymer compound layer 27.

In order to confirm the kinds (such as materials and compositions) of the polymer compound and the conductive material contained in the cathode-side polymer compound layer 27, for example, the following method may be used.

The secondary battery may be disassembled, and the cathode-side polymer compound layer 27 may be taken out, and thereafter, a cross-section of the cathode-side polymer compound layer 27 may be observed and analyzed. Examples of a method of such observation and a method of such analysis may include one or more of an optical microscope and scanning electron microscope-energy dispersive X-ray spectrometry (SEM-EDX).

Moreover, the cathode-side polymer compound layer 27 may be extracted with use of an organic solvent such as N-methyl-2-pyrrolidone to separate the polymer compound having solubility and the conductive material having insolubility from each other, and thereafter, the polymer compound and the conductive material may be analyzed. Examples of a method of such analysis may include one or more of nuclear magnetic resonance (NMR) spectroscopy, an X-ray diffraction (XRD) method, a gas chromatography method, and mass spectrometry.

[Separator]

The separator 23 separates the cathode 21 from the anode 22, and passes lithium ions therethrough while preventing current short circuit that results from contact between the cathode 21 and the anode 22.

The separator 23 may be, for example, one or more of porous films such as porous films of a synthetic resin and ceramics. The separator 23 may be a laminated film in which two or more porous films are laminated. Examples of the synthetic resin may include polytetrafluoroethylene, polypropylene, and polyethylene.

The separator 23 provided between the cathode 21 and the anode 22 has an insulation property. Accordingly, the cathode 21 and the anode 22 are electrically separated from each other with the separator 23 in between.

[Electrolytic Solution]

The spirally wound electrode body 20 is impregnated with the electrolytic solution as described above.

This electrolytic solution may contain one or more of solvents and one or more of electrolytic salts. It is to be noted that the electrolytic solution may further contain one or more of various materials such as an additive together with the solvents and the electrolyte salts mentioned above.

The solvents include a nonaqueous solvent such as an organic solvent. An electrolytic solution containing the nonaqueous solvent is a so-called nonaqueous electrolytic solution.

Examples of the solvent may include a cyclic carbonate ester, a chain carbonate ester, a lactone, a chain carboxylate ester, and a nitrile (mononitrile), which make it possible to achieve, for example, high battery capacity, superior cycle characteristics, and superior storage characteristics.

Specific examples of the cyclic carbonate ester may include ethylene carbonate, propylene carbonate, and butylene carbonate. Specific examples of the chain carbonate ester may include dimethyl carbonate, diethyl carbonate, ethyl methyl carbonate, and methylpropyl carbonate. Specific examples of the lactone may include γ-butyrolactone and γ-valerolactone. Specific examples of the chain carboxylate ester may include methyl acetate, ethyl acetate, methyl propionate, ethyl propionate, propyl propionate, methyl butyrate, methyl isobutyrate, methyl trimethylacetate, and ethyl trimethylacetate. Specific examples of the nitrile may include acetonitrile, methoxyacetonitrile, and 3-methoxypropionitrile.

Other than the materials mentioned above, examples of the solvent may include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, and dimethylsulfoxide. These solvents make it possible to achieve similar advantages.

In particular, one or more of ethylene carbonate, propylene carbonate, dimethyl carbonate, diethyl carbonate, and ethyl methyl carbonate may be preferable. These materials make it possible to achieve, for example, higher battery capacity, further superior cycle characteristics, and further superior storage characteristics.

In this case, a combination of a high-viscosity (high dielectric constant) solvent (having, for example, specific dielectric constant $\varepsilon \geq 30$) and a low-viscosity solvent (having, for example, viscosity$\leq 1$ mPa·s) may be more preferable. The high-viscosity solvent is the cyclic carbonate ester such as ethylene carbonate and propylene carbonate, and the low-viscosity solvent is the chain carbonate ester such as dimethyl carbonate, ethylmethyl carbonate, and diethyl carbonate. The combination allows for an improvement in the dissociation property of the electrolyte salt and ion mobility.

It is to be noted that in a case in which the combination of the cyclic carbonate ester and the chain carbonate ester is used, a mixture ratio of the cyclic carbonate ester and the chain carbonate ester is not particularly limited. However, the ratio of the cyclic carbonate ester may be preferably 20 wt % or more, which allows for an improvement in cycle characteristics. The ratio of the cyclic carbonate ester (wt %) is represented by (a weight of the cyclic carbonate ester/the sum of the weight of the cyclic carbonate ester and a weight of the chain carbonate ester)×100.

In particular, the solvents may include an unsaturated cyclic carbonate ester, a halogenated carbonate ester, a sulfonate ester, an acid anhydride, a dinitrile compound, and a diisocyanate compound, which make it possible to improve chemical stability of the electrolytic solution.

The unsaturated cyclic carbonate ester is a cyclic carbonate ester having one or more unsaturated bonds (carbon-carbon double bonds). Specific examples of the unsaturated cyclic carbonate ester may include vinylene carbonate (1,3-dioxol-2-one), vinyl ethylene carbonate (4-vinyl-1,3-dioxolane-2-one), and methylene ethylene carbonate (4-methylene-1,3-dioxolane-2-one). A content of the unsaturated cyclic carbonate ester in the solvent is not particularly limited, but may be, for example, from 0.01 wt % to 10 wt % both inclusive.

The halogenated carbonate ester is a cyclic or chain carbonate ester containing one or more halogens as constituent elements. The kind of the halogen is not particularly limited, but examples of the halogen may include one or more of elements such as fluorine (F), chlorine (Cl), bromine (Br), and iodine (I). Specific examples of the cyclic halogenated carbonate ester may include 4-fluoro-1,3-dioxolane-2-one and 4,5-difluoro-1,3-dioxolane-2-one. Specific examples of the chain halogenated carbonate ester may include fluoromethyl methyl carbonate, bis(fluoromethyl) carbonate, and difluoromethyl methyl carbonate. A content of the halogenated carbonate ester in the solvent is not particularly limited, but may be, for example, from 0.01 wt % to 50 wt % both inclusive.

Examples of the sulfonate ester may include a monosulfonate ester and a disulfonate ester. The monosulfonate ester may be a cyclic monosulfonate ester or a chain monosulfonate ester. Specific examples of the cyclic monosulfonate ester may include sultone such as 1,3-propane sultone and 1,3-propene sultone. Specific examples of the chain monosulfonate ester may include a compound in which a cyclic monosulfonate ester is cleaved at a middle site. The disulfonate ester may be a cyclic disulfonate ester or a chain disulfonate ester. A content of the sulfonate ester in the solvent is not particularly limited, but may be, for example, from 0.5 wt % to 5 wt % both inclusive.

Examples of the acid anhydride may include a carboxylic anhydride, a disulfonic anhydride, and a carboxylic-sulfonic anhydride. Specific examples of the carboxylic anhydride may include succinic anhydride, glutaric anhydride, and maleic anhydride. Specific examples of the disulfonic anhydride may include ethanedisulfonic anhydride and propanedisulfonic anhydride. Specific examples of the carboxylic-sulfonic anhydride may include sulfobenzoic anhydride, sulfopropionic anhydride, and sulfobutyric anhydride. A content of the acid anhydride in the solvent is not particularly limited, but may be, for example, from 0.5 wt % to 5 wt % both inclusive.

Examples of the dinitrile compound may include a compound represented by $NC-C_mH_{2m}-CN$ (where m is an integer of 1 or more). Specific examples of the dinitrile compound may include succinonitrile ($NC-C_2H_4-CN$), glutaronitrile ($NC-C_3H_6-CN$), adiponitrile ($NC-C_4H_8-CN$), and phthalonitrile ($NC-C_6H_5-CN$). A content of the dinitrile compound in the solvent is not particularly limited, but may be, for example, from 0.5 wt % to 5 wt % both inclusive.

Examples of the diisocyanate compound may include a compound represented by $OCN-C_nH_{2n}-NCO$ (where n is an integer of 1 or more). Specific examples of the diisocyanate compound may include $OCN-C_6H_{12}-NCO$. A content of the diisocyanate compound in the solvent is not particularly limited, but may be, for example, from 0.5 wt % to 5 wt % both inclusive.

Examples of the electrolyte salt may include one or more of lithium salts. However, the electrolyte salt may contain a salt other than the lithium salt. Examples of the salt other than lithium may include a salt of a light metal other than lithium.

Examples of the lithium salt may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). These lithium salts make it possible to achieve, for example, high battery capacity, superior cycle characteristics, and superior storage characteristics.

In particular, one or more of $LiPF_6$, $LiBF_4$, $LiClO_4$, and $LiAsF_6$ may be preferable, and $LiPF_6$ may be more preferable. These lithium salts make it possible to decrease the internal resistance, thereby achieving a higher effect.

A content of the electrolyte salt is not particularly limited. However, in particular, the content of the electrolyte salt may be preferably from 0.3 mol/kg to 3.0 mol/kg both inclusive with respect to the solvent, which makes it possible to achieve high ionic conductivity.

[Operation of Secondary Battery]

The secondary battery may operate as follows, for example.

When the secondary battery is charged, lithium ions are extracted from the cathode 21 and the extracted lithium ions are inserted in the anode 22 through the electrolytic solution. In contrast, when the secondary battery is discharged, lithium ions are extracted from the anode 22 and the extracted lithium ions are inserted in the cathode 21 through the electrolytic solution.

[Method of Manufacturing Secondary Battery]

The secondary battery may be manufactured by the following procedure, for example.

When fabricating the cathode 21, first, the cathode active material, and, on as-necessary basis, for example, the cathode binder and the cathode conductor may be mixed to obtain a cathode mixture. Subsequently, the cathode mixture may be dispersed in, for example, an organic solvent to obtain paste cathode mixture slurry. Next, both surfaces of the cathode current collector 21A may be coated with the cathode mixture slurry, and thereafter, the coated cathode mixture slurry may be dried to form the cathode active material layers 21B. Thereafter, the cathode active material layers 21B may be compression-molded with use of, for example, a roll pressing machine, while being heated on as-necessary basis. In this case, the cathode active material layer 21B may be compression-molded a plurality of times.

When fabricating the anode 22, the anode active material layer 22B may be formed on the anode current collector 22A by a procedure similar to the foregoing procedure of fabricating the cathode 21. More specifically, the anode active material, and, on as-necessary basis, for example, the anode binder and the anode conductor may be mixed to obtain an anode mixture. Subsequently, the anode mixture may be dispersed in, for example, an organic solvent to obtain paste anode mixture slurry. Next, both surfaces of the anode current collector 22A may be coated with the anode mixture slurry, and thereafter, the coated anode mixture slurry may be dried to form the anode active material layer 22B. Lastly, the anode active material layer 22B may be compression-molded with use of, for example, a roll pressing machine.

When forming the cathode-side polymer compound layer 27, the solvent such as an organic solvent, the polymer compound, and the conductive material may be mixed to prepare a process solution. In the process solution, the polymer compound may be dissolved in the solvent, and the conductive material may be dispersed in the solvent in which the polymer compound is dissolved. Subsequently, the cathode 21 may be coated with the process solution, and thereafter, the process solution may be dried. It is to be noted that instead of coating the cathode 21 with the process solution, the cathode 21 may be immersed in the process solution, and thereafter the cathode 21 may be dried.

Herein, when forming the cathode-side polymer compound layer 27, instead of coating the cathode 21 with the process solution, a surface facing the cathode 21 of the separator 23 may be coated with the process solution. Even if any of the forming methods is used, the cathode-side polymer compound layer 27 may be eventually interposed between the cathode 21 and the separator 23.

When forming the anode-side polymer compound layer 28, a procedure similar to the foregoing procedure of forming the cathode-side polymer compound layer 27 may be used, except that instead of the cathode 21, the anode 22 is coated with the process solution. It goes without saying that when forming the anode-side polymer compound layer 28, the anode 22 may be immersed in the process solution, or a surface facing the anode 22 of the separator 23 may be coated with the process solution.

When assembling the secondary battery, the cathode lead 25 may be attached to the cathode current collector 21A by, for example, a welding method, and the anode lead 26 may be attached to the anode current collector 22A by, for example, a welding method. Subsequently, the cathode 21 on which the cathode-side polymer compound layer 27 is formed and the anode 22 on which the anode-side polymer compound layer 28 is formed may be stacked with the separator 23 in between. Next, the cathode 21, the anode 22, the separator 23, the cathode-side polymer compound layer 27, and the anode-side polymer compound layer 28 may be spirally wound to form the spirally wound electrode body 20. Thereafter, the center pin 24 may be inserted in the center of the spirally wound electrode body 20.

Subsequently, the spirally wound electrode body 20 may be sandwiched between the pair of insulating plates 12 and 13, and may be contained inside the battery can 11. In this case, an end tip of the cathode lead 25 may be attached to the safety valve mechanism 15 by, for example, a welding method, and an end tip of the anode lead 26 may be attached to the battery can 11 by, for example, a welding method. Subsequently, the electrolytic solution may be injected inside the battery can 11, and the spirally wound electrode body 20 may be impregnated with the injected electrolytic solution. Lastly, the battery cover 14, the safety valve mechanism 15, and the PTC device 16 may be swaged with the gasket 17 at the open end of the battery can 11. Thus, the cylindrical type secondary battery is completed.

[Action and Effects of Secondary Battery]

According to the secondary battery, the cathode-aside polymer compound layer 27 is provided between the cathode 21 and the anode 22 so as to be adjacent to the cathode 21, and the anode-side polymer compound layer 28 is provided between the cathode 21 and the anode 22 so as to be adjacent to the anode 22. In this case, it is possible to achieve the foregoing three advantages. Accordingly, as compared with a case in which the cathode-side polymer compound layer 27 and the anode-side polymer compound layer 28 are not provided, even if the secondary battery is repeatedly charged and discharged, discharge capacity is less prone to decrease, which makes it possible to achieve superior battery characteristics.

In particular, since both the cathode-side polymer compound layer 27 and the anode-side polymer compound layer 28 are provided, as compared with a case in which only one of the cathode-side polymer compound layer 27 and the anode-side polymer compound layer 28 is provided, the discharge capacity is less prone to decrease, which makes it possible to further improve battery characteristics.

Moreover, the polymer compound contains one or more of the homopolymer of vinylidene fluoride and the copolymer of vinylidene fluoride, and when the conductive material contains the carbon material, a higher effect is achievable.

Further, when one or both of the cathode-side polymer compound layer 27 and the anode-side polymer compound layer 28 contain the insulating material, a higher effect is achievable.

1-1-2. MODIFICATION EXAMPLE 1

It is to be noted that in FIG. 2, both the cathode-side polymer compound layer 27 adjacent to the cathode 21 and the anode-side polymer compound layer 28 adjacent to the anode 22 are provided, but the embodiment is not limited thereto.

For example, as illustrated in FIG. 3 corresponding to FIG. 2, only the cathode-side polymer compound layer 27 may be provided without providing the anode-side polymer compound layer 28. In this case, while the cathode 21 may be separated from the separator 23 with the cathode-side polymer compound layer 27 in between, the anode 22 may be adjacent to the separator 23.

Even in this case, use of the cathode-side polymer compound layer 27 makes it possible to achieve the above-described advantages, thereby achieving superior battery characteristics.

1-1-3. MODIFICATION EXAMPLE 2

Moreover, for example, as illustrated in FIG. 4 corresponding to FIG. 2, only the anode-side polymer compound layer 28 may be provided without providing the cathode-side polymer compound layer 27. In this case, while the cathode 21 may be adjacent to the separator 23, the anode 22 may be separated from the separator 23 with the anode-side polymer compound layer 28 in between.

Even in this case, use of the anode-side polymer compound layer 28 makes it possible to achieve the above-described advantages, thereby achieving superior battery characteristics.

However, in order to remarkably improve the battery characteristics, providing both the cathode-side polymer compound layer 27 and the anode-side polymer compound layer 28 may be more preferable than providing only one of the cathode-side polymer compound layer 27 and the anode-side polymer compound layer 28.

Moreover, in a case in which only one of the cathode-side polymer compound layer 27 and the anode-side polymer compound layer 28 is provided, it may be preferable to provide the anode-side polymer compound layer 28. As described above, in the anode-side polymer compound layer 28 adjacent to the anode 22, the conductive network including the anode active material is maintained by the conductive material (the conductive path); therefore, the anode active material is less prone to be electrically isolated.

1-2. LITHIUM-ION SECONDARY BATTERY (LAMINATED FILM TYPE)

FIG. 5 illustrates a perspective configuration of another secondary battery, and FIG. 6 illustrates a cross-section taken along a line VI-VI of a spirally wound electrode body 30 illustrated in FIG. 5. FIG. 7 illustrates a cross-sectional configuration of part of the spirally wound electrode body 30 illustrated in FIG. 6. It is to be noted that FIG. 5 illustrates a state in which the spirally wound electrode body 30 and an outer package member 40 are separated from each other.

In the following description, the components of the cylindrical type secondary battery that have been already described are used where appropriate.

1-2-1. BASIC CONFIGURATION

[Whole Configuration of Secondary Battery]

The other secondary battery may be a lithium-ion secondary battery having a so-called laminated film type battery configuration. In the secondary battery, for example, the spirally wound electrode body 30 as a battery element may be contained inside the film-like outer package member 40 as illustrated in FIG. 5.

In the spirally wound electrode body 30, for example, a cathode 33 and an anode 34 may be stacked with a separator 35, a cathode-side polymer compound layer 36, and an anode-side polymer compound layer 37 in between, and the cathode 33, the anode 34, the separator 35, the cathode-side polymer compound layer 36, and the anode-side polymer compound layer 37 may be spirally wound. A cathode lead 31 may be attached to the cathode 33, and an anode lead 32 may be attached to the anode 34. An outermost periphery of the spirally wound electrode body 30 may be protected by a protective tape 38.

Each of the cathode lead 31 and the anode lead 32 may be led out from inside to outside of the outer package member 40 in a same direction, for example. The cathode lead 31 may be made of, for example, one or more of conductive materials such as aluminum (Al). The anode lead 32 may be made of, for example, one or more of conductive materials such as copper (Cu), nickel (Ni), and stainless steel. These conductive materials may have, for example, one or more of shapes such as a thin-plate shape or a mesh shape.

The outer package member 40 may be, for example, one film that is foldable in a direction of an arrow R illustrated in FIG. 5, and the outer package member 40 may have a depression for containing of the spirally wound electrode body 30 in part thereof. The outer package member 40 may be a laminated film in which a fusion bonding layer, a metal layer, and a surface protective layer are laminated in this order, for example. In a process of manufacturing the secondary battery, the outer package member 40 may be folded so that portions of the fusion-bonding layer face each other with the spirally wound electrode body 30 in between, and thereafter outer edges of the portions of the fusion bonding layer may be fusion-bonded. Alternatively, two laminated films bonded to each other by, for example, an adhesive may form the outer package member 40. Examples of the fusion bonding layer may include a film made of one or more of polyethylene, polypropylene, and other materials. The metal layer may include, for example, one or more of an aluminum foil and other metal materials. The surface protective layer may be, for example, a film made of one or more of nylon, polyethylene terephthalate, and other materials.

In particular, the outer package member 40 may preferably be an aluminum laminated film in which a polyethylene film, an aluminum foil, and a nylon film are laminated in this order. However, the outer package member 40 may be a laminated film having any other laminated structure, a polymer film such as polypropylene, or a metal film.

For example, an adhesive film 41 for prevention of outside air intrusion may be inserted between the outer package member 40 and the cathode lead 31. Moreover, for example, the foregoing adhesive film 41 may be inserted between the outer package member 40 and the anode lead 32. The adhesive film 41 may be made of a material having adhesibility with respect to the cathode lead 31 and the anode lead 32. Examples of the material having adhesibility may include a polyolefin resin. More specific examples thereof may include one or more of polyethylene, polypropylene, modified polyethylene, and modified polypropylene.

[Cathode, Anode, and Separator]

The cathode 33 may include, for example, a cathode current collector 33A and a cathode active material layer 33B, and the anode 34 may include, for example, an anode current collector 34A and an anode active material layer 34B. The configurations of the cathode current collector 33A, the cathode active material layer 33B, the anode current collector 34A, and the anode active material layer 34B may be similar to, for example, the configurations of the cathode current collector 21A, the cathode active material layer 21B, the anode current collector 22A, and the anode active material layer 22B, respectively. The configuration of the separator 35 may be similar to, for example, the configuration of the separator 23.

[Cathode-Side Polymer Compound Layer and Anode-Side Polymer Compound Layer]

The cathode-side polymer compound layer 36 may be provided between the cathode 33 and the anode 34 so as to be adjacent to the cathode 33, and the anode-side polymer compound layer 37 may be provided between the cathode 33 and the anode 34 so as to be adjacent to the anode 34. The cathode-side polymer compound layer 36 and the anode-side polymer compound layer 37 may have configurations similar to those of the cathode-side polymer compound layer 27 and the anode-side polymer compound layer 28, respectively, except for points to be described below.

The cathode-side polymer compound layer 36 and the anode-side polymer compound layer 37 described here may have configurations similar to those of the cathode-side polymer compound layer 27 and the anode-side polymer compound layer 28, respectively, as described above. In this case, the spirally round electrode body 30 may be impregnated with the electrolytic solution, as described above.

Alternatively, one or both of the cathode-side polymer compound layer 36 and the anode-side polymer compound layer 37 may contain the electrolytic solution. The electrolytic solution may have a composition similar to that of the electrolytic solution in the cylindrical type secondary battery.

In a case in which the cathode-side polymer compound layer 36 and the anode-side polymer compound layer 37 each contain the electrolytic solution, the cathode-side polymer compound layer 36 and the anode-side polymer compound layer 37 each are a so-called gel electrolyte. In the cathode-side polymer compound layer 36 and the anode-side polymer compound layer 37, the electrolytic solution is held by the polymer compound. This allows for achievement of high ionic conductivity (for example, 1 mS/cm or more at room temperature), and prevents liquid leakage of the electrolytic solution.

The cathode-side polymer compound layer 36 containing the electrolytic solution and the anode-side polymer compound layer 37 containing the electrolytic solution each serve as an electrolyte layer (a so-called polymer electrolyte). In contrast, the cathode-side polymer compound layer 36 not containing the electrolytic solution and the anode-side polymer compound layer 37 not containing the electrolytic solution each do not serve as an electrolyte layer, and are a non-electrolyte layer.

In the gel electrolyte, the solvent contained in the electrolytic solution refers to a wide concept that encompasses not only a liquid material but also a material having ionic conductivity that has ability to dissociate the electrolyte salt. Hence, in a case in which a polymer compound having ionic conductivity is used, the polymer compound is also encompassed by the solvent.

[Operation of Secondary Battery]

The secondary battery may operate, for example, as follows. Note that a case in which the cathode-side polymer compound layer 36 and the anode-side polymer compound layer 37 each contain the electrolytic solution is described below.

When the secondary battery is charged, lithium ions are extracted from the cathode 33, and the extracted lithium ions are inserted in the anode 34 through the cathode-side polymer compound layer 36 and the anode-side polymer compound layer 37. In contrast, when the secondary battery is discharged, lithium ions are extracted from the anode 34, and the extracted lithium ions are inserted in the cathode 33 through the cathode-side polymer compound layer 36 and the anode-side polymer compound layer 37.

[Method of Manufacturing Secondary Battery]

The secondary battery including the cathode-side polymer compound layer 36 and the anode-side polymer compound layer 37 that each serve as the gel electrolyte may be manufactured, for example, by one of the following three procedures.

In a first procedure, the cathode 33 and the anode 34 may be fabricated by a fabrication procedure similar to that of the cathode 21 and the anode 22. More specifically, the cathode 33 may be fabricated by forming the cathode active material layer 33B on both surfaces of the cathode current collector 33A, and the anode 34 may be fabricated by forming the anode active material layer 34B on both surfaces of the anode current collector 34A.

Subsequently, for example, the electrolytic solution, the polymer compound, the conductive material, and an organic solvent may be mixed to prepare a precursor solution. Subsequently, the cathode 33 may be coated with the precursor solution, and the coated precursor solution may be dried to form the cathode-side polymer compound layer 36 that is a gel electrolyte. Moreover, the anode 34 may be coated with the precursor solution, and the coated precursor solution may be dried to form the anode-side polymer compound layer 37 that is a gel electrolyte.

It is to be noted that in a case in which the cathode-side polymer compound layer 36 is formed, instead of coating the cathode 33 with the precursor solution, a surface facing the cathode 33 of the separator 35 may be coated with the precursor solution. Moreover, in a case in which the anode-side polymer compound layer 37 is formed, instead of coating the anode 34 with the precursor solution, a surface facing the anode 34 of the separator 35 may be coated with the precursor solution.

Subsequently, an end tip of the cathode lead 31 may be attached to the cathode current collector 33A by, for example, a welding method, and an end tip of the anode lead 32 may be attached to the anode current collector 34A by, for example, a welding method. Subsequently, the cathode 33 on which the cathode-side polymer compound layer 36 is formed and the anode 34 on which the anode-side polymer compound layer 37 is formed may be stacked with the separator 35 in between, and thereafter, the cathode 33, the anode 34, the separator 35, the cathode-side polymer compound layer 36, and the anode-side polymer compound layer 37 may be spirally wound to fabricate the spirally wound electrode body 30. Thereafter, the protective tape 38 may be attached onto the outermost periphery of the spirally wound body 30. Subsequently, the outer package member 40 may be folded to interpose the spirally wound electrode body 30, and thereafter, the outer edges of the outer package member 40 may be bonded by, for example, a thermal fusion bonding method to enclose the spirally wound electrode body 30 in the outer package member 40. In this case, the adhesive film 41 may be inserted between the cathode lead 31 and the outer package member 40, and the adhesive film 41 may be inserted between the anode lead 32 and the outer package member 40.

In a second procedure, the cathode lead 31 may be attached to the cathode 33, and the anode lead 32 may be attached to the anode 34. Subsequently, the cathode 33 and the anode 34 may be stacked with the separator 35 in between and may be spirally wound to fabricate a spirally wound body as a precursor of the spirally wound electrode body 30. Thereafter, the protective tape 38 may be adhered to the outermost periphery of the spirally wound body. Subsequently, the outer package member 40 may be folded to interpose the spirally wound body, and thereafter, the outer edges other than one side of the outer package member 40 may be bonded by, for example, a thermal fusion bonding method, and the spirally wound body may be contained inside a pouch formed of the outer package member 40. Subsequently, the electrolytic solution, monomers that are raw materials of the polymer compound, the conductive material, a polymerization initiator, and, on as-necessary basis, other materials such as a polymerization inhibitor may be mixed to prepare a composition for electrolyte. Subsequently, the composition for electrolyte may be injected inside the pouch formed of the outer package member 40. Thereafter, the pouch formed of the outer package member 40 may be hermetically sealed by, for example, a thermal fusion bonding method. Subsequently, the monomers may be thermally polymerized to form the polymer compound. Thus, the electrolytic solution may be held by the polymer compound, and the cathode-side polymer compound layer 36 and the anode-side polymer compound layer 37 that each are a gel electrolyte may be thereby formed.

In a third procedure, the spirally wound body may be fabricated and contained inside the pouch formed of the outer package member 40 in a manner similar to that of the second procedure described above, except that the separator 35 on which the cathode-side polymer compound layer 36 not containing the electrolytic solution and the anode-side polymer compound layer 37 not containing the electrolytic solution are formed is used. Subsequently, the electrolytic solution may be prepared and injected inside the pouch formed of the outer package member 40. Thereafter, an opening of the pouch formed of the outer package member 40 may be hermetically sealed by, for example, a thermal fusion bonding method. Subsequently, the resultant may be heated while a weight is applied to the outer package member 40 to cause the separator 35 to be closely attached to the cathode 33 with the cathode-side polymer compound layer 36 in between and be closely attached to the anode 34 with the anode-side polymer compound layer 37 in between. Thus, the cathode-side polymer compound layer 36 and the anode-side polymer compound layer 37 each may be impregnated with the electrolytic solution, and the cathode-side polymer compound layer 36 and the anode-side polymer compound layer 37 each may be gelated.

[Action and Effects of Secondary Battery]

According to the secondary battery, the cathode-side polymer compound layer 36 is provided between the cathode 33 and the anode 34 so as to be adjacent to the cathode 33, and the anode-side polymer compound layer 37 is provided between the cathode 33 and the anode 33 so as to be adjacent to the anode 34. This makes it possible to achieve superior battery characteristics for a reason similar to the reason in the foregoing cylindrical type secondary battery. Action and effects other than those described above are similar to those of the cylindrical type secondary battery.

1-2-2. MODIFICATION EXAMPLE 1

It is to be noted that in FIG. 7, both the cathode-side polymer compound layer 36 adjacent to the cathode 33 and the anode-side polymer compound layer 37 adjacent to the anode 34 are provided, but the embodiment is not limited thereto.

For example, as illustrated in FIG. 8 corresponding to FIG. 7, only the cathode-side polymer compound layer 36 may be provided without providing the anode-side polymer compound layer 37. In this case, while the cathode 33 may be separated from the separator 35 with the cathode-side polymer compound layer 36 in between, the anode 34 may be adjacent to the separator 35.

Even in this case, use of the cathode-side polymer compound layer 36 makes it possible to achieve the above-described advantages, thereby achieving superior battery characteristics.

1-2-3. MODIFICATION EXAMPLE 2

Moreover, for example, as illustrated in FIG. 9 corresponding to FIG. 7, only the anode-side polymer compound layer 37 may be provided without providing the cathode-side polymer compound layer 36. In this case, while the cathode 33 may be adjacent to the separator 35, the anode 34 may be separated from the separator 35 with the anode-side polymer compound layer 37 in between.

Even in this case, use of the anode-side polymer compound layer 37 makes it possible to achieve the above-described advantages, thereby achieving superior battery characteristics.

However, in order to remarkably improve the battery characteristics, as with the case described referring to the cathode-aside polymer compound layer 27 and the anode-side polymer compound layer 28, providing both the cathode-side polymer compound layer 36 and the anode-side polymer compound layer 37 may be preferable. Moreover, in a case in which only one of the cathode-side polymer compound layer 36 and the anode-side polymer compound layer 37 is provided, it may be preferable to provide the anode-side polymer compound layer 37.

1-3. LITHIUM METAL SECONDARY BATTERY

A secondary battery described here is a cylindrical type secondary battery (lithium metal secondary battery) in which the capacity of the anode 22 is obtained by precipitation and dissolution of lithium metal. The secondary battery has a configuration similar to that of the foregoing lithium ion secondary battery (cylindrical type), and is manufactured by a similar procedure, except that the anode active material layer 22B is made of the lithium metal.

In the secondary battery, the lithium metal is used as an anode active material, and high energy density is thereby achievable. The anode active material layer 22B may exist at the time of assembling, or the anode active material layer 22B may not necessarily exist at the time of assembling and may be made of the lithium metal precipitated during charge. Further, the anode active material layer 22B may be used as a current collector, and the anode current collector 22A may be omitted.

The secondary battery may operate, for example, as follows. When the secondary battery is charged, lithium ions are extracted from the cathode 21, and the extracted lithium ions are precipitated as the lithium metal on the surface of the anode current collector 22A through the electrolytic solution. In contrast, when the secondary battery is discharged, the lithium metal is eluded as lithium ions from the anode active material layer 22B, and is inserted in the cathode 21 through the electrolytic solution.

According to the cylindrical type lithium metal secondary battery, the cathode-side polymer compound layer 27 and the anode-side polymer compound layer 28 are provided between the cathode 21 and the anode 22. Therefore, superior battery characteristics are achievable for a reason similar to the reason in the foregoing lithium-ion secondary battery. Action and effects other than those described above are similar to those of the cylindrical type secondary battery.

It is to be noted that the lithium metal secondary battery described here is not limited to the cylindrical type secondary battery, and may be a laminated film type secondary battery. Even in this case, similar effects are achievable.

2. APPLICATIONS OF SECONDARY BATTERY

Next, description is given of application examples of any of the secondary batteries mentioned above.

Applications of the secondary battery are not particularly limited as long as the secondary battery is applied to, for example, a machine, a device, an instrument, an apparatus, and a system (a collective entity of, for example, a plurality of devices) that are able to use the secondary battery as a driving power source, an electric power storage source for electric power accumulation, or any other source. The secondary battery used as the power source may be a main power source (a power source used preferentially), or may be an auxiliary power source (a power source used instead of the main power source or used being switched from the main power source). In a case in which the secondary battery is used as the auxiliary power source, the kind of the main power source is not limited to the secondary battery.

Examples of the applications of the secondary battery may include electronic apparatuses (including portable electronic apparatuses) such as a video camcorder, a digital still camera, a mobile phone, a notebook personal computer, a cordless phone, a headphone stereo, a portable radio, a portable television, and a portable information terminal. Further examples thereof may include: a mobile lifestyle appliance such as an electric shaver; a storage device such as a backup power source and a memory card; an electric power tool such as an electric drill and an electric saw; a battery pack used as an attachable and detachable power source of, for example, a notebook personal computer; a medical electronic apparatus such as a pacemaker and a hearing aid; an electric vehicle such as an electric automobile (including a hybrid automobile); and an electric power storage system such as a home battery system for accumulation of electric power for, for example, emergency. It goes without saying that the secondary battery may be employed for an application other than the applications mentioned above.

In particular, the secondary battery is effectively applicable to, for example, the battery pack, the electric vehicle, the electric power storage system, the electric power tool, and the electronic apparatus. In these applications, superior battery characteristics are demanded, and using the secondary battery of the present technology makes it possible to effectively improve performance. It is to be noted that the battery pack is a power source that uses the secondary battery, and may be, for example, a so-called assembled battery. The electric vehicle is a vehicle that operates (runs) using the secondary battery as a driving power source, and may be an automobile (such as a hybrid automobile) that includes together a drive source other than the secondary battery, as described above. The electric power storage system is a system that uses the secondary battery as an electric power storage source. For example, in a home electric power storage system, electric power is accumulated in the secondary battery that is the electric power storage source, which makes it possible to use, for example, home electric products with use of the accumulated electric power. The electric power tool is a tool in which a movable section (such as a drill) is allowed to be moved with use of the secondary battery as a driving power source. The electronic apparatus is an apparatus that executes various functions with use of the secondary battery as a driving power source (an electric power supply source).

Hereinafter, specific description is given of some application examples of the secondary battery. It is to be noted that configurations of the respective application examples described below are mere examples, and may be changed as appropriate.

2-1. BATTERY PACK (SINGLE BATTERY)

FIG. 10 illustrates a perspective configuration of a battery pack using a single battery. FIG. 11 illustrates a block configuration of the battery pack illustrated in FIG. 10. It is to be noted that FIG. 10 illustrates the battery back in an exploded state.

The battery back described here is a simple battery pack using one secondary battery of the present technology (a so-called soft pack), and may be mounted in, for example, an electronic apparatus typified by a smartphone. For example, the battery pack may include a power source 111 that is the laminated film type secondary battery, and a circuit board 116 coupled to the power source 111, as illustrated in FIG. 10. A cathode lead 112 and an anode lead 113 are attached to the power source 111.

A pair of adhesive tapes 118 and 119 are adhered to both side surfaces of the power source 111. A protection circuit module (PCM) is formed in the circuit board 116. The circuit board 116 is coupled to the cathode lead 112 through a tab 114, and is coupled to the anode lead 113 through a tab 115. Moreover, the circuit board 116 is coupled to a lead 117 provided with a connector for external connection. It is to be noted that while the circuit board 116 is coupled to the power source 111, the circuit board 116 is protected from upper side and lower side by a label 120 and an insulating sheet 121. The label 120 may be adhered to fix, for example, the circuit board 116 and the insulating sheet 121.

Moreover, for example, the battery pack may include the power source 111 and the circuit board 116 as illustrated in FIG. 11. The circuit board 116 may include, for example, a controller 121, a switch section 122, a PTC device 123, and a temperature detector 124. The power source 111 is connectable to outside through a cathode terminal 125 and an anode terminal 127, and is thereby charged and discharged through the cathode terminal 125 and the anode terminal 127. The temperature detector 124 is allowed to detect a temperature with use of a temperature detection terminal (a so-called T terminal) 126.

The controller 121 controls an operation of the entire battery pack (including a used state of the power source 111), and may include, for example, a central processing unit (CPU) and a memory.

For example, in a case in which a battery voltage reaches an overcharge detection voltage, the controller 121 may so cause the switch section 122 to be disconnected that a charge current does not flow into a current path of the power source 111. Moreover, for example, in a case in which a large current flows during charge, the controller 121 may cause the switch section 122 to be disconnected, thereby blocking the charge current.

In addition, for example, in a case in which the battery voltage reaches an overdischarge detection voltage, the controller 121 may so cause the switch section 122 to be disconnected that a discharge current does not flow into the current path of the power source 111. Moreover, for example, in a case in which a large current flows during discharge, the controller 121 may cause the switch section 122 to be disconnected, thereby blocking the discharge current.

It is to be noted that the overcharge detection voltage of the secondary battery may be, for example, 4.20 V±0.05 V, and the overdischarge detection voltage may be, for example, 2.4 V±0.1 V.

The switch section 122 switches the used state of the power source 111 (whether the power source 111 is connectable to an external device) in accordance with an instruction from the controller 121. The switch section 122 may include, for example, a charge control switch and a discharge control switch. The charge control switch and the discharge control switch each may be, for example, a semiconductor switch such as a field-effect transistor using a metal oxide semiconductor (MOSFET). It is to be noted that the charge current and the discharge current may be detected on the basis of on-resistance of the switch section 122.

The temperature detector 124 measures a temperature of the power source 111, and outputs a result of the measurement to the controller 121. The temperature detector 124 may include, for example, a temperature detecting element such as a thermistor. It is to be noted that the result of the measurement by the temperature detector 124 may be used, for example, in a case in which the controller 121 performs charge and discharge control at the time of abnormal heat generation and in a case in which the controller 121 performs a correction process at the time of calculating remaining capacity.

It is to be noted that the circuit board 116 may not include the PTC device 123. In this case, a PTC device may be separately attached to the circuit board 116.

2-2. BATTERY PACK (ASSEMBLED BATTERY)

FIG. 12 illustrates a block configuration of a battery pack using an assembled battery. For example, the battery pack may include a controller 61, a power source 62, a switch section 63, a current measurement section 64, a temperature detector 65, a voltage detector 66, a switch controller 67, a memory 68, a temperature detecting element 69, a current detection resistance 70, a cathode terminal 71, and an anode terminal 72 inside a housing 60. The housing 60 may be made of, for example, a plastic material.

The controller 61 controls an operation of the entire battery pack (including a used state of the power source 62), and may include, for example, a CPU. The power source 62 includes one or more secondary batteries. The power source 62 may be, for example, an assembled battery that includes two or more secondary batteries. The secondary batteries may be connected in series, in parallel, or in series-parallel combination. To give an example, the power source 62 may include six secondary batteries in which two sets of series-connected three batteries are connected in parallel to each other.

The switch section 63 switches the used state of the power source 62 (whether the power source 62 is connectable to an external device) in accordance with an instruction from the controller 61. The switch section 63 may include, for example, a charge control switch, a discharge control switch, a charging diode, and a discharging diode. The charge control switch and the discharge control switch each may be, for example, a semiconductor switch such as a field-effect transistor that uses a metal oxide semiconductor (a MOSFET).

The current measurement section 64 measures a current with the use of the current detection resistance 70, and outputs a result of the measurement to the controller 61. The temperature detector 65 measures a temperature with the use of the temperature detecting element 69, and outputs a result of the measurement to the controller 61. The result of the temperature measurement may be used, for example, in a case in which the controller 61 performs charge and discharge control at the time of abnormal heat generation and in a case in which the controller 61 performs a correction process at the time of calculating remaining capacity. The voltage detector 66 measures voltages of the secondary batteries in the power source 62, performs analog-to-digital conversion on the measured voltage, and supplies the resultant to the controller 61.

The switch controller 67 controls an operation of the switch section 63 in accordance with signals inputted from the current measurement section 64 and the voltage detector 66.

For example, in a case in which a battery voltage reaches an overcharge detection voltage, the switch controller 67 may so cause the switch section 63 (the charge control switch) to be disconnected that a charge current does not flow into a current path of the power source 62. This makes it possible to perform only discharge through the discharging diode in the power source 62. It is to be noted that, for example, when a large current flows during charge, the switch controller 67 may block the charge current.

Further, for example, in a case in which the battery voltage reaches an overdischarge detection voltage, the switch controller 67 may so cause the switch section 63 (the discharge control switch) to be disconnected that a discharge current does not flow into the current path of the power source 62. This makes it possible to perform only charge through the charging diode in the power source 62. It is to be noted that, for example, when a large current flows during discharge, the switch controller 67 may block the discharge current.

It is to be noted that the overcharge detection voltage of the secondary battery may be, for example, 4.20 V±0.05 V, and the overdischarge detection voltage may be, for example, 2.4 V±0.1 V.

The memory 68 may be, for example, an EEPROM that is a non-volatile memory. The memory 68 may hold, for example, numerical values calculated by the controller 61 and information of the secondary battery measured in a manufacturing process (such as internal resistance in an initial state). It is to be noted that, in a case in which the memory 68 holds full charge capacity of the secondary battery, the controller 61 is allowed to comprehend information such as remaining capacity.

The temperature detecting element 69 measures a temperature of the power source 62, and outputs a result of the measurement to the controller 61. The temperature detecting element 69 may be, for example, a thermistor.

The cathode terminal 71 and the anode terminal 72 are terminals that may be coupled to, for example, an external device (such as a notebook personal computer) driven with use of the battery pack or an external device (such as a battery charger) used for charge of the battery pack. The power source 62 is charged and discharged via the cathode terminal 71 and the anode terminal 72.

2-3. ELECTRIC VEHICLE

FIG. 13 illustrates a block configuration of a hybrid automobile that is an example of an electric vehicle. The electric vehicle may include, for example, a controller 74, an engine 75, a power source 76, a driving motor 77, a differential 78, an electric generator 79, a transmission 80, a clutch 81, inverters 82 and 83, and various sensors 84 inside a housing 73 made of metal. Other than the components mentioned above, the electric vehicle may include, for example, a front drive shaft 85 and a front tire 86 that are coupled to the differential 78 and the transmission 80, and a rear drive shaft 87, and a rear tire 88.

The electric vehicle may be runnable with use of one of the engine 75 and the motor 77 as a drive source, for example. The engine 75 is a main power source, and may be, for example, a petrol engine. In a case in which the engine 75 is used as the power source, drive power (torque) of the engine 75 may be transferred to the front tire 86 or the rear tire 88 via the differential 78, the transmission 80, and the clutch 81 that are drive sections, for example. It is to be noted that the torque of the engine 75 may be also transferred to the electric generator 79. With use of the torque, the electric generator 79 generates alternating-current electric power. The generated alternating-current electric power is converted into direct-current electric power via the inverter 83, and the converted electric power is accumulated in the power source 76. In a case in which the motor 77 that is a conversion section is used as the power source, electric power (direct-current electric power) supplied from the power source 76 is converted into alternating-current electric power via the inverter 82, and the motor 77 is driven with use of the alternating-current electric power. Drive power (torque) obtained by converting the electric power by the motor 77 may be transferred to the front tire 86 or the rear tire 8 via the differential 78, the transmission 80, and the clutch 81 that are the drive sections, for example.

It is to be noted that, when speed of the electric vehicle is decreased by an unillustrated brake mechanism, resistance at the time of speed reduction may be transferred to the motor 77 as torque, and the motor 77 may generate alternating-current electric power by utilizing the torque. It may be preferable that this alternating-current electric power be converted into direct-current electric power via the inverter 82, and the direct-current regenerative electric power be accumulated in the power source 76.

The controller 74 controls an operation of the entire electric vehicle, and may include, for example, a CPU. The power source 76 includes one or more secondary batteries. The power source 76 may be coupled to an external power source, and the power source 76 may be allowed to accumulate electric power by receiving electric power supply from the external power source. The various sensors 84 may be used, for example, for control of the number of revolutions of the engine 75 and for control of an opening level (a throttle opening level) of an unillustrated throttle valve. The various sensors 84 may include, for example, a speed sensor, an acceleration sensor, and an engine frequency sensor.

It is to be noted that, although the description has been given of the case in which the electric vehicle is the hybrid automobile, the electric vehicle may be a vehicle (an electric automobile) that operates with use of only the power source 76 and the motor 77 and without using the engine 75.

2-4. ELECTRIC POWER STORAGE SYSTEM

FIG. 14 illustrates a block configuration of an electric power storage system. The electric power storage system may include, for example, a controller 90, a power source 91, a smart meter 92, and a power hub 93 inside a house 89 such as a general residence or a commercial building.

In this example, the power source 91 may be coupled to an electric device 94 provided inside the house 89 and may be allowed to be coupled to an electric vehicle 96 parked outside the house 89, for example. Further, for example, the power source 91 may be coupled to a private power generator 95 provided in the house 89 via the power hub 93, and may be allowed to be coupled to an outside concentrating electric power system 97 via the smart meter 92 and the power hub 93.

It is to be noted that the electric device 94 may include, for example, one or more home electric products. Examples of the home electric products may include a refrigerator, an air conditioner, a television, and a water heater. The private power generator 95 may include, for example, one or more of a solar power generator, a wind power generator, and other power generators. The electric vehicle 96 may include, for example, one or more of an electric automobile, an electric motorcycle, a hybrid automobile, and other electric vehicles. The concentrating electric power system 97 may include, for example, one or more of a thermal power plant, an atomic power plant, a hydraulic power plant, a wind power plant, and other power plants.

The controller 90 controls an operation of the entire electric power storage system (including a used state of the power source 91), and may include, for example, a CPU. The power source 91 includes one or more secondary batteries. The smart meter 92 may be an electric power meter that is compatible with a network and is provided in the house 89 demanding electric power, and may be communicable with an electric power supplier, for example. Accordingly, for example, while the smart meter 92 communicates with outside, the smart meter 92 controls balance between supply and demand in the house 89, which allows for effective and stable energy supply.

In the electric power storage system, for example, electric power may be accumulated in the power source 91 from the concentrating electric power system 97, that is an external power source, via the smart meter 92 and the power hub 93, and electric power may be accumulated in the power source 91 from the private power generator 95, that is an independent power source, via the power hub 93. The electric power accumulated in the power source 91 is supplied to the electric device 94 and the electric vehicle 96 in accordance with an instruction from the controller 90. This allows the electric device 94 to be operable, and allows the electric vehicle 96 to be chargeable. In other words, the electric power storage system is a system that makes it possible to accumulate and supply electric power in the house 89 with use of the power source 91.

The electric power accumulated in the power source 91 is allowed to be utilized optionally. Hence, for example, electric power may be accumulated in the power source 91 from the concentrating electric power system 97 in the middle of night when an electric rate is inexpensive, and the electric power accumulated in the power source 91 may be used during daytime hours when the electric rate is expensive.

It is to be noted that the foregoing electric power storage system may be provided for each household (each family unit), or may be provided for a plurality of households (a plurality of family units).

2-5. ELECTRIC POWER TOOL

FIG. 15 illustrates a block configuration of an electric power tool. The electric power tool may be, for example, an electric drill, and may include a controller 99 and a power source 100 inside a tool body 98 made of a plastic material, for example. A drill section 101 that is a movable section may be attached to the tool body 98 in an operable (rotatable) manner, for example.

The controller 99 controls an operation of the entire electric power tool (including a used state of the power source 100), and may include, for example, a CPU. The power source 100 includes one or more secondary batteries. The controller 99 allows electric power to be supplied from the power source 100 to the drill section 101 in accordance with an operation by an operation switch.

EXAMPLES

Examples of the present technology will be described in detail below.

Experimental Examples 1-1 to 1-13

The laminated film type lithium-ion secondary batteries illustrated in FIGS. 5 to 9 were fabricated by the following procedure.

The cathode 33 was fabricated as follows. First, 96 parts by mass of a cathode active material ($LiCoO_2$), 3 parts by mass of a cathode binder (polyvinylidene fluoride: PVDF), and 1 part by mass of a cathode conductor (carbon black) were mixed to obtain a cathode mixture. A weight-average molecular weight of the PVDF was about 500000, and this also applies to the following examples. Subsequently, the cathode mixture was dispersed in an organic solvent (N methyl-2-pyrrolidone: NMP) to obtain paste cathode mixture slurry. Subsequently, both surfaces of the cathode current collector 33A (a strip-shaped aluminum foil having a thickness of 20 µm) were coated with the cathode mixture slurry with use of a coating apparatus, and thereafter, the cathode mixture slurry was dried to form the cathode active material layer 33B. Lastly, the cathode active material layer 33B was compression-molded with use of a roll pressing machine.

The anode 34 was fabricated as follows. First, 90 parts by mass of an anode active material (graphite that is a carbon material) and 10 parts by mass of an anode binder (PVDF) were mixed to obtain an anode mixture. Subsequently, the anode mixture was dispersed in an organic solvent (NMP) to obtain paste anode mixture slurry. Subsequently, both surfaces of the anode current collector 34A (a strip-shaped electrolytic copper foil having a thickness of 15 µm) were coated with the anode mixture slurry, and thereafter, the anode mixture slurry was dried to form the anode active material layer 34B. Lastly, the anode active material layer 34B was compression-molded with use of a roll pressing machine.

The cathode-side polymer compound layer 36 serving as an electrolyte layer was formed as follows. First, an organic solvent (dimethyl carbonate), a polymer compound (PVDF), a conductive material, an insulating material, and an electrolytic solution were mixed to form a mixture, and thereafter, the mixture was stirred to prepare a precursor solution. In this case, for comparison, the cathode-side polymer compound layer 36 was formed by a similar procedure, except that one or both of the conductive material and the insulating material were not used. The presence or absence of each of the conductive material and the insulating material are as illustrated in Table 1.

As the conductive material, a carbon material was used. The carbon material was one of carbon black (CB), acetylene black (AB), ketjen black (KB), carbon nanotubes (CNT), and vapor grown carbon fibers (VGCF). As the CB, KS-6 manufactured by TIMCAL (TIMCAL Graphite & Carbon). As the AB, DENKA BLACK HS-100 manufactured by Denki Kagaku Kogyo Kabushiki Kaisha was used. As the KB, carbon ECP manufactured by Lion Corporation was used. As the CNT, NT-7 manufactured by Hodogaya Chemical Co., Ltd. was used. As the VGCF, VGCF-H manufactured by Showa Denko K.K. was used. A mixture ratio (weight ratio) of the polymer compound and the conductive material was the polymer compound: the conductive material=3:1 in Experimental Examples 1-3 and 1-5, and the polymer compound:the conductive material=2:1 in other experimental examples.

As the insulating material, aluminum oxide ($Al_2O_3$) was used. A mixture ratio (weight ratio) of the polymer compound, the conductive material, and the insulating material was the polymer compound:the conductive material:the insulating material=1:1:2. An average particle diameter (D50) of the $Al_2O_3$ was from about 0.1 µm to about 2.5 µm both inclusive.

The electrolytic solution was prepared as follows. An electrolyte salt ($LiPF_6$) was dissolved in a solvent. As the solvent, ethylene carbonate (EC), propylene carbonate (PC), and ethylmethyl carbonate (EMC) were used. The composition (weight ratio) of the solvent was as illustrated in Table 1. A content of the electrolyte salt was 1 mol/kg with respect to the solvent.

Next, the cathode 33 was coated with the precursor solution, and thereafter, the precursor solution was dried to form the cathode-side polymer compound layer 36. It is to be noted that in Table 1, as the kind of the polymer compound layer, the cathode-side polymer compound layer 36 is simply represented by "Cathode-side".

It is to be noted that when a cross-section of the cathode-side polymer compound layer 36 was observed with use of an electron microscope, a state in which the conductive material was dispersed in the cathode-side polymer compound layer 36 was observed.

When the anode-side polymer compound layer 37 serving as an electrolyte layer was formed by a procedure similar to the procedure of forming the cathode-side polymer compound layer 36, except that instead of the cathode 33, the anode 34 was coated with the precursor solution. It is to be noted that in Table 1, as the kind of the polymer compound layer, the anode-side polymer compound layer 37 is simply represented by "Anode-side".

It is to be noted that when a cross-section of the anode-side polymer compound layer 37 was observed with use of an electron microscope, a state in which the conductive material was dispersed in the anode-side polymer compound layer 37 was observed.

The secondary battery was assembled as follows. First, the cathode lead 31 made of aluminum was attached to the cathode current collector 33A by welding, and the anode lead 32 made of copper was attached to the anode current collector 34A by welding. Subsequently, the cathode 33 on which the cathode-side polymer compound layer 36 was formed and the anode 34 on which the anode-side polymer compound layer 37 was formed were stacked with the separator 35 (a microporous polypropylene film having a thickness of 23 µm) in between, and the cathode 33, the anode 34, the separator 35, the cathode-side polymer compound layer 36, and the anode-side polymer compound layer 37 were spirally wound in a longitudinal direction to fabricate the spirally wound electrode body 30. Thereafter, the protective tape 38 was attached onto the outermost periphery of the spirally wound electrode body 30.

Subsequently, the outer package member 40 was folded to interpose the spirally wound electrode body 30, and thereafter, the outer edges on three sides of the outer package member 40 were thermally fusion-bonded. Thus, the spirally wound electrode body 30 was contained inside a pouch formed of the outer package member 40. The outer package member 40 used here was a moisture-resistant aluminum laminated film (having a total thickness of 100 µm) in which a nylon film (having a thickness of 30 µm), an aluminum foil (having a thickness of 40 µm), and a cast polypropylene film (having a thickness of 30 µm) were laminated from outside.

Lastly, the electrolytic solution was injected inside the outer package member 40, and the spirally wound electrode body 30 was impregnated with the electrolytic solution. Thereafter, outer edges on the remaining one side of the outer package member 40 were thermally fusion-bonded in a reduced-pressure environment. In this case, the adhesive film 41 (an acid-modified propylene film having a thickness of 50 µm) was inserted between cathode lead 31 and the outer package member 40, and the adhesive film 41 was inserted between the anode lead 32 and the outer package member 40 in a similar manner. Thus, the laminated film type secondary batteries were completed.

It is to be noted that, for comparison, secondary batteries were fabricated by a similar procedure, except that one or both of the cathode-side polymer compound layer 36 and the anode-side polymer compound layer 37 were not formed.

The presence or absence of each of the cathode-side polymer compound layer 36 and the anode-side polymer compound layer 37 was as illustrated in Table 1.

capacity (theoretical capacity) is completely discharged in ⅓ hours, and "0.05 C" refers to a current value at which the battery capacity is completely discharged in 20 hours.

TABLE 1

| | | Polymer Compound Layer (Electrolyte Layer) | | | | | |
|---|---|---|---|---|---|---|---|
| Experimental Example | Anode Active Material | Kind | Polymer Compound | Conductive Material | Insulating Material | Solvent Composition of Electrolytic Solution | Capacity Retention Ratio (%) |
| 1-1 | Graphite | Anode-side | PVDF | CB | — | EC:PC = 50:50 | 96 |
| 1-2 | Graphite | Anode-side | PVDF | AB | — | EC:PC = 50:50 | 97 |
| 1-3 | Graphite | Anode-side | PVDF | KB | — | EC:PC = 50:50 | 95 |
| 1-4 | Graphite | Anode-side | PVDF | CNT | — | EC:PC = 50:50 | 96 |
| 1-5 | Graphite | Anode-side | PVDF | VGCF | — | EC:PC = 50:50 | 95 |
| 1-6 | Graphite | Cathode-side | PVDF | CB | — | EC:PC = 50:50 | 90 |
| 1-7 | Graphite | Cathode-side + Anode-side | PVDF | CB | — | EC:PC = 50:50 | 97 |
| 1-8 | Graphite | Anode-side | PVDF | CB | — | EC:PC:EMC = 10:10:80 | 95 |
| 1-9 | Graphite | Anode-side | PVDF | CB | — | EC:PC:EMC = 5:5:90 | 78 |
| 1-10 | Graphite | Anode-side | PVDF | CB | $Al_2O_3$ | EC:PC = 50:50 | 97 |
| 1-11 | Graphite | — | — | — | — | EC:PC = 50:50 | 45 |
| 1-12 | Graphite | Anode-side | PVDF | — | — | EC:PC = 50:50 | 54 |
| 1-13 | Graphite | Anode-side | PVDF | — | $Al_2O_3$ | EC:PC = 50:50 | 55 |

When the secondary batteries were fabricated, the thickness of the cathode active material layer 33B was so adjusted as to cause the charge-discharge capacity of the anode 34 to be larger than charge-discharge capacity of the cathode 33, thereby preventing lithium metal from being precipitated on the anode 34 in a completely-charged state.

When cycle characteristics were examined as battery characteristics of each of the secondary batteries, results illustrated in Table 1 were obtained.

The cycle characteristics were examined as follows. First, one cycle of charge and discharge was performed on the secondary battery in an ambient temperature environment (23° C.) to stabilize a battery state of the secondary battery, and thereafter, one cycle of charge and discharge was further performed on the secondary battery in a low-temperature environment (0° C.) to measure discharge capacity at the second cycle. Subsequently, the secondary battery was repeatedly charged and discharged until the total number of cycles reached 500 cycles in the same temperature environment (0° C.) to measure discharge capacity at the 500th cycle. A capacity retention ratio (%)=(discharge capacity at the 500th cycle/discharge capacity at the second cycle)×100 was calculated from these results.

When the secondary battery was charged, charge was performed at a current of 3 C until the voltage reached 4.2 V, and thereafter, charge was further performed at the voltage of 4.2 V until the current reached 0.05 C. When the secondary battery was discharged, discharge was performed at a current of 3 C until the voltage reached 3.0 V. It is to be noted that "3 C" refers to a current value at which the battery The capacity retention ratio greatly varied depending on the presence or absence of each of the cathode-side polymer compound layer 36 serving as the electrolyte layer and the anode-side polymer compound layer 37 serving as the electrolyte layer.

More specifically, in a case in which one or both of the cathode-side polymer compound layer 36 containing the conductive material and the anode-side polymer compound layer 37 containing the conductive material were formed (Experimental Examples 1-1 to 1-10), the capacity retention ratio was extremely high. In contrast, in a case in which the cathode-side polymer compound layer 36 and the anode-side polymer compound layer 37 were not formed (Experimental Example 1-11), and a case in which the anode-side polymer compound layer 37 not containing the conductive material was formed (Experimental Examples 1-12 and 1-13), the capacity retention ratio was extremely low.

In particular, in the case in which one or both of the cathode-side polymer compound layer 36 containing the conductive material and the anode-side polymer compound layer 37 containing the conductive material were formed, the following tendencies were obtained.

Firstly, in a case in which only the anode-side polymer compound layer 37 was formed (Experimental Example 1-1), as compared with a case in which only the cathode-side polymer compound layer 36 was formed (Experimental Example 1-6), the capacity retention ratio was further increased.

Secondly, in a case in which both the cathode-side polymer compound layer 36 and the anode-side polymer compound layer 37 were formed (Experimental Example 1-7), as compared with a case in which only one of them was formed (Experimental Examples 1-1 and 1-6), the capacity retention ratio was further increased.

Thirdly, in a case in which the anode-side polymer compound layer 37 contained the insulating material (Experimental Example 1-10), as compared with a case in which the anode-side polymer compound layer 37 did not contain the insulating material (Experimental Example 1-1), the capacity retention ratio was further increased.

Fourthly, attention is given to a case in which the solvent contained the cyclic carbonate ester (EC and PC) and the chain carbonate ester (EMC) in the composition of the electrolytic solution contained in the anode-side polymer compound layer 37. In this case, in a case in which the ratio of the cyclic carbonate ester in the solvent was 20 wt % or more (Experimental Example 1-8), as compared with a case in which the ratio was less than 20 wt %, (Experimental Example 1-9), the capacity retention ratio was further increased.

Experimental Examples 2-1 to 2-3

The secondary batteries were fabricated by a similar procedure, except that the anode-side polymer compound layer 37 that was a non-electrolyte layer was formed instead of the anode-side polymer compound layer 37 serving as the electrolyte layer. When the battery characteristics of the secondary batteries were examined, results illustrated in Table 2 were obtained.

The anode-side polymer compound layer 37 that was the non-electrolyte layer was formed by a procedure similar to the procedure of forming the anode-side polymer compound layer 37 serving as the electrolyte layer, except that the anode-side polymer compound layer 37 did not contain the electrolyte solution. In this case, instead of containing the electrolytic solution in the anode-side polymer compound layer 37, the spirally wound electrode body 30 was impregnated with the electrolytic solution.

TABLE 2

| Experimental Example | Anode Active Material | Polymer Compound Layer (Non-electrolyte Layer) | | | Capacity Retention Ratio (%) |
| --- | --- | --- | --- | --- | --- |
| | | Kind | Polymer Compound | Conductive Material | |
| 2-1 | Graphite | Anode-side | PVDF | CB | 96 |
| 2-2 | Graphite | — | — | — | 42 |
| 2-3 | Graphite | Anode-side | PVDF | — | 50 |

Since the anode-side polymer compound layer 37 did not contain the electrolytic solution, even in a case in which the anode-side polymer compound layer 37 was the non-electrolyte layer, results similar to those in Table 1 were obtained. More specifically, in a case in which the anode-side polymer compound layer 37 containing the conductive material was formed (Experimental Example 2-1), as compared with a case in which the anode-side polymer compound layer 37 containing the conductive material was not formed (Experimental Examples 2-2 and 2-3), the capacity retention ratio was remarkably increased.

Experimental Examples 3-1 to 3-12

The secondary batteries were fabricated by a similar procedure, except that instead of the carbon material, a metal-based material was used as the anode active material. When the battery characteristics of the secondary batteries were examined, results illustrated in Table 3 were obtained.

As the anode active material, the simple substance of silicon (Si), an oxide of silicon (SiO), and the simple substance of tin (Sn) were used. Moreover, as the anode active material, a mixture of a metal-based material (the simple substance of silicon) and a carbon material (graphite) was used. A mixture ratio (weight ratio) of the simple substance of silicon and graphite was the simple substance of silicon:graphite=20:80.

TABLE 3

| Experimental Example | Anode Active Material | Polymer Compound Layer (Electrolyte Layer) | | | Solvent Composition of Electrolytic Solution | Capacity Retention Ratio (%) |
| --- | --- | --- | --- | --- | --- | --- |
| | | Kind | Polymer Compound | Conductive Material | | |
| 3-1 | Si | Anode-side | PVDF | CB | EC:PC = 50:50 | 90 |
| 3-2 | Si + Graphite | Anode-side | PVDF | CB | EC:PC = 50:50 | 96 |
| 3-3 | SiO | Anode-side | PVDF | CB | EC:PC = 50:50 | 92 |
| 3-4 | Sn | Anode-side | PVDF | CB | EC:PC = 50:50 | 91 |
| 3-5 | Si | — | — | — | EC:PC = 50:50 | 31 |
| 3-6 | Si + Graphite | — | — | — | EC:PC = 50:50 | 41 |
| 3-7 | SiO | — | — | — | EC:PC = 50:50 | 39 |
| 3-8 | Sn | — | — | — | EC:PC = 50:50 | 34 |
| 3-9 | Si | Anode-side | PVDF | — | EC:PC = 50:50 | 40 |
| 3-10 | Si + Graphite | Anode-side | PVDF | — | EC:PC = 50:50 | 51 |
| 3-11 | SiO | Anode-side | PVDF | — | EC:PC = 50:50 | 49 |
| 3-12 | Sn | Anode-side | PVDF | — | EC:PC = 50:50 | 46 |

Even in a case in which the metal-based material was used as the anode active material, results similar to those in Table 1 were obtained. More specifically, in a case in which the anode-side polymer compound layer 37 containing the conductive material was formed (Experimental Examples 3-1 to 3-4), as compared with a case in which the anode-side polymer compound layer 37 containing the conductive material was not formed (Experimental Examples 3-5 to 3-12), the capacity retention ratio was remarkably increased.

As can be seen from the results illustrated in Tables 1 to 3, when the polymer compound layer in which the conductive material was dispersed in the polymer compound was provided between the cathode and the anode, the cycle characteristics were improved. Accordingly, the secondary battery achieved superior battery characteristics.

Although the present technology has been described above referring to some embodiments and examples, the present technology is not limited thereto, and may be modified in a variety of ways.

For example, the description has been given with reference to examples in which the battery structure is of the cylindrical type and the laminated film, and the battery element has the spirally wound structure. However, the battery structure and the battery element structure are not limited thereto. The secondary battery of the present technology is similarly applicable also to a case in which other battery structure such as that of a square type or a button type is employed. Moreover, the secondary battery of the present technology is similarly applicable also to a case in which the battery element has other structure such as a stacked structure.

Moreover, the description has been given with reference to an example in which lithium is used as the electrode reactant; however, the electrode reactant is not limited thereto. The electrode reactant may be any of Group 1 elements (excluding lithium) and Group 2 elements in the long form of the periodic table of the elements, and other elements. Examples of the group 1 elements may include sodium (Na) and potassium (K). Examples of the Group 2 elements may include magnesium (Mg) and calcium (Ca). Examples of the other elements may include aluminum (Al).

Further, a structure regarding polymer compounds of the present technology may be applicable not only to secondary batteries but also to other electrochemical devices. Examples of other electrochemical devices may include a capacitor.

Note that the effects described in the present specification are illustrative and non-limiting. The technology may have effects other than those described in the present specification.

It is to be noted that the present technology may have the following configurations.

(1)
A secondary battery, including:
a cathode;
an anode; and
(1) a first polymer compound layer disposed between the cathode and the anode and being adjacent to the cathode,
(2) a second polymer compound layer disposed between the cathode and the anode and being adjacent to the anode, or
(3) the first polymer compound layer and the second polymer compound layer, wherein
one or both of the first polymer compound layer and the second polymer compound layer contain a polymer compound containing fluorine (F) as a constituent element and a conductive material dispersed in the polymer compound.

(2)
The secondary battery according to (1), wherein
the polymer compound contains one or more of a homopolymer of vinylidene fluoride and a copolymer of vinylidene fluoride, and
the conductive material contains one or more of carbon materials.

(3)
The secondary battery according to (1) or (2), wherein
one or both of the first polymer compound layer and the second polymer compound layer contain an electrolytic solution, and
the electrolytic solution contains a solvent and an electrolyte salt.

(4)
The secondary battery according to any one of (1) to (3), wherein one or both of the first polymer compound layer and the second polymer compound layer contain an insulating material dispersed in the polymer compound.

(5)
The secondary battery according to (4), wherein the insulating material contains one or more of metal oxides and metal nitrides.

(6)
The secondary battery according to any one of (1) to (5), further including a separator disposed between the first polymer compound layer and the second polymer compound layer.

(7)
The secondary battery according to any one (1) to (6), wherein the anode contains one or more of a carbon material and a material containing one or both of silicon (Si) and tin (Sn) as constituent elements.

(8)
The secondary battery according to any one of (1) to (7), wherein the secondary battery is a lithium-ion secondary battery.

(9)
A battery pack including:
the secondary battery according to any one of (1) to (8);
a controller that controls an operation of the secondary battery; and
a switch section that switches the operation of the secondary battery in accordance with an instruction from the controller.

(10)
An electric vehicle including:
the secondary battery according to any one of (1) to (8);
a converter that converts electric power supplied from the secondary battery into drive power;
a drive section that operates in accordance with the drive power; and
a controller that controls an operation of the secondary battery.

(11)
An electric power storage system including:
the secondary battery according to any one of (1) to (8);
one or more electric devices that are supplied with electric power from the secondary battery; and
a controller that controls the supplying of the electric power from the secondary battery to the one or more electric devices.

(12)

An electric power tool including:
the secondary battery according to any one of (1) to (8); and
a movable section that is supplied with electric power from the secondary battery.

(13)

An electronic apparatus including the secondary battery according to any one of (1) to (8) as an electric power supply source.

The present application is based on and claims priority from Japanese Patent Application No. 2014-210083 filed in the Japan Patent Office on Oct. 14, 2014, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A secondary battery, comprising:
a cathode;
an anode; and
(1) a first polymer compound layer disposed between the cathode and the anode and being adjacent to the cathode, (2) a second polymer compound layer disposed between the cathode and the anode and being adjacent to the anode, or (3) the first polymer compound layer and the second polymer compound layer,
wherein one or both of the first polymer compound layer and the second polymer compound layer contain a polymer compound containing fluorine (F) as a constituent element and a conductive material dispersed in the polymer compound,
wherein one or both of the first polymer compound layer and the second polymer compound layer contain an insulating material dispersed in the polymer compound, and
wherein the insulating material contains one or more of metal oxides and metal nitrides.

2. The secondary battery according to claim 1, wherein the polymer compound contains one or more of a homopolymer of vinylidene fluoride and a copolymer of vinylidene fluoride, and
the conductive material contains one or more of carbon materials.

3. The secondary battery according to claim 1, wherein one or both of the first polymer compound layer and the second polymer compound layer contain an electrolytic solution, and
the electrolytic solution contains a solvent and an electrolyte salt.

4. The secondary battery according to claim 1, further comprising a separator disposed between the first polymer compound layer and the second polymer compound layer.

5. The secondary battery according to claim 1, wherein the anode contains one or more of a carbon material and a material containing one or both of silicon (Si) and tin (Sn) as constituent elements.

6. The secondary battery according to claim 1, wherein the secondary battery is a lithium-ion secondary battery.

7. A battery pack, comprising:
a secondary battery;
a controller that controls an operation of the secondary battery; and
a switch section that switches the operation of the secondary battery in accordance with an instruction from the controller,
the secondary battery including
a cathode,
an anode, and
(1) a first polymer compound layer disposed between the cathode and the anode and being adjacent to the cathode, (2) a second polymer compound layer disposed between the cathode and the anode and being adjacent to the anode, or (3) the first polymer compound layer and the second polymer compound layer,
wherein one or both of the first polymer compound layer and the second polymer compound layer contain a polymer compound containing fluorine (F) as a constituent element and a conductive material dispersed in the polymer compound,
wherein one or both of the first polymer compound layer and the second polymer compound layer contain an insulating material dispersed in the polymer compound, and
wherein the insulating material contains one or more of metal oxides and metal nitrides.

8. An electric vehicle, comprising:
a secondary battery;
a converter that converts electric power supplied from the secondary battery into drive power;
a drive section that operates in accordance with the drive power; and
a controller that controls an operation of the secondary battery,
the secondary battery including
a cathode,
an anode, and
(1) a first polymer compound layer disposed between the cathode and the anode and being adjacent to the cathode, (2) a second polymer compound layer disposed between the cathode and the anode and being adjacent to the anode, or (3) the first polymer compound layer and the second polymer compound layer,
wherein one or both of the first polymer compound layer and the second polymer compound layer contain a polymer compound containing fluorine (F) as a constituent element and a conductive material dispersed in the polymer compound,
wherein one or both of the first polymer compound layer and the second polymer compound layer contain an insulating material dispersed in the polymer compound, and
wherein the insulating material contains one or more of metal oxides and metal nitrides.

9. An electric power storage system, comprising:
a secondary battery;
one or more electric devices that are supplied with electric power from the secondary battery; and
a controller that controls the supplying of the electric power from the secondary battery to the one or more electric devices,
the secondary battery including
a cathode,
an anode, and
(1) a first polymer compound layer disposed between the cathode and the anode and being adjacent to the cathode, (2) a second polymer compound layer disposed between the cathode and the anode and being adjacent to the anode, or (3) the first polymer compound layer and the second polymer compound layer,
  wherein one or both of the first polymer compound layer and the second polymer compound layer contain a polymer compound containing fluorine (F) as a constituent element and a conductive material dispersed in the polymer compound,
  wherein one or both of the first polymer compound layer and the second polymer compound layer contain an insulating material dispersed in the polymer compound, and
  wherein the insulating material contains one or more of metal oxides and metal nitrides.

10. An electric power tool, comprising:
a secondary battery; and
a movable section that is supplied with electric power from the secondary battery, the secondary battery including
  a cathode,
  an anode, and
  (1) a first polymer compound layer disposed between the cathode and the anode and being adjacent to the cathode, (2) a second polymer compound layer disposed between the cathode and the anode and being adjacent to the anode, or (3) the first polymer compound layer and the second polymer compound layer,
    wherein one or both of the first polymer compound layer and the second polymer compound layer contain a polymer compound containing fluorine (F) as a constituent element and a conductive material dispersed in the polymer compound,
    wherein one or both of the first polymer compound layer and the second polymer compound layer contain an insulating material dispersed in the polymer compound, and
    wherein the insulating material contains one or more of metal oxides and metal nitrides.

11. An electronic apparatus, comprising
a secondary battery as an electric power supply source, the secondary battery including
  a cathode,
  an anode, and
  (1) a first polymer compound layer disposed between the cathode and the anode and being adjacent to the cathode, (2) a second polymer compound layer disposed between the cathode and the anode and being adjacent to the anode, or (3) the first polymer compound layer and the second polymer compound layer,
    wherein one or both of the first polymer compound layer and the second polymer compound layer contain a polymer compound containing fluorine (F) as a constituent element and a conductive material dispersed in the polymer compound,
    wherein one or both of the first polymer compound layer and the second polymer compound layer contain an insulating material dispersed in the polymer compound, and
    wherein the insulating material contains one or more of metal oxides and metal nitrides.

* * * * *